United States Patent
Matsumoto et al.

(10) Patent No.: US 8,324,529 B2
(45) Date of Patent: Dec. 4, 2012

(54) LASER MACHINING DEVICE WITH A CONVERGED LASER BEAM AND LASER MACHINING METHOD

(75) Inventors: Naoya Matsumoto, Hamamatsu (JP); Takashi Inoue, Hamamatsu (JP); Norihiro Fukuchi, Hamamatsu (JP); Haruyasu Ito, Hamamatsu (JP); Yuu Takiguchi, Hamamatsu (JP)

(73) Assignee: Hamamatsu Photonics K.K., Hamamatsu-shi, Shizuoka (JP)

( * ) Notice: Subject to any disclaimer, the term of this patent is extended or adjusted under 35 U.S.C. 154(b) by 243 days.

(21) Appl. No.: 12/742,491

(22) PCT Filed: Aug. 26, 2008

(86) PCT No.: PCT/JP2008/065191
§ 371 (c)(1),
(2), (4) Date: Jun. 10, 2010

(87) PCT Pub. No.: WO2009/063670
PCT Pub. Date: May 22, 2009

(65) Prior Publication Data
US 2010/0270277 A1    Oct. 28, 2010

(30) Foreign Application Priority Data

Nov. 14, 2007 (JP) ................. P2007-295931

(51) Int. Cl.
*B23K 26/00* (2006.01)
*B23K 26/14* (2006.01)
*B23K 26/16* (2006.01)
*B23K 26/06* (2006.01)
*B23K 26/02* (2006.01)

(52) U.S. Cl. ......... 219/121.72; 219/121.67; 219/121.68; 219/121.69; 219/121.73; 219/121.75; 219/121.78; 219/121.85

(58) Field of Classification Search ............. 219/121.67, 219/121.68, 121.69, 121.72, 121.73, 121.75, 219/121.78, 121.85
See application file for complete search history.

(56) References Cited

U.S. PATENT DOCUMENTS
4,376,303 A * 3/1983 Lurie ................... 369/44.23
(Continued)

FOREIGN PATENT DOCUMENTS
CN          1069360          2/1993
(Continued)

OTHER PUBLICATIONS
R.W. Gerchberg, et al., "A Practical Algorithm for the Determination of Phase from Image and Diffraction Plane Pictures," Cavendish Laboratory, Cambridge, England, OPTIK, vol. 35, No. 2, 1972, pp. 237-246.
(Continued)

*Primary Examiner* — Ida M Soward
(74) *Attorney, Agent, or Firm* — Drinker Biddle & Reath LLP

(57) ABSTRACT

A laser machining device 1 includes a laser light source 10, a spatial light modulator 20, a controller 22, a converging optical system 30, and a shielding member 40. The phase-modulating spatial light modulator 20 inputs a laser beam outputted from the laser light source 10, displays a hologram modulating a phase of the laser beam at each of a plurality of pixels arranged two-dimensionally, and outputs the phase-modulated laser beam. The controller 22 causes the spatial light modulator 20 to display a plurality of holograms sequentially, lets the converging optical system 30 converge the laser beam outputted from the spatial light modulator 20 at converging positions having a fixed number of M, selectively places N converging positions out of the M converging positions into a machining region 91, and machines an object to be machined 90.

48 Claims, 32 Drawing Sheets

U.S. PATENT DOCUMENTS

| | | | |
|---|---|---|---|
| 4,798,948 A * | 1/1989 | Neumann et al. | 250/201.3 |
| 5,132,811 A * | 7/1992 | Iwaki et al. | 359/6 |
| 5,334,816 A * | 8/1994 | Sugiyama | 219/121.83 |
| 5,523,543 A * | 6/1996 | Hunter et al. | 219/121.62 |
| 5,727,226 A * | 3/1998 | Blaum et al. | 359/35 |
| RE36,560 E * | 2/2000 | Svetkoff et al. | 356/608 |
| 6,353,203 B1 * | 3/2002 | Hokodate et al. | 219/121.67 |
| 6,420,676 B2 * | 7/2002 | Sawai et al. | 219/121.7 |
| 6,710,292 B2 * | 3/2004 | Fukuchi et al. | 219/121.73 |
| 6,862,120 B2 * | 3/2005 | Tanaka et al. | 359/7 |
| 6,875,951 B2 * | 4/2005 | Sakamoto et al. | 219/121.73 |
| 7,116,626 B1 * | 10/2006 | Woods et al. | 369/103 |
| 7,251,066 B2 * | 7/2007 | Chao et al. | 359/22 |
| 7,325,929 B2 * | 2/2008 | Yavid et al. | 353/31 |
| 7,567,494 B2 * | 7/2009 | Shimokawa | 369/103 |
| 7,605,961 B2 * | 10/2009 | Klug et al. | 359/9 |
| 7,715,073 B2 * | 5/2010 | Yoshikawa et al. | 359/24 |
| 2002/0159052 A1 * | 10/2002 | Klooster et al. | 356/237.2 |
| 2002/0196534 A1 * | 12/2002 | Lizotte et al. | 359/362 |
| 2004/0027968 A1 * | 2/2004 | Horimai | 369/103 |
| 2004/0212859 A1 * | 10/2004 | Tsukagoshi | 359/15 |
| 2006/0140102 A1 * | 6/2006 | Sigel et al. | 369/103 |
| 2006/0227317 A1 * | 10/2006 | Henderson et al. | 356/28 |
| 2009/0128874 A1 * | 5/2009 | Iwamura et al. | 359/22 |
| 2009/0279153 A1 * | 11/2009 | Iwamura et al. | 359/22 |

FOREIGN PATENT DOCUMENTS

| | | |
|---|---|---|
| CN | 1597229 | 3/2005 |
| CN | 1757479 | 4/2006 |
| JP | 49-56650 | 6/1974 |
| JP | 54-102692 | 8/1979 |
| JP | 57-81986 | 5/1982 |
| JP | 62-263862 | 11/1987 |
| JP | 07-290264 | 11/1995 |
| JP | 08215875 A * | 8/1996 |
| JP | 2723798 | 11/1997 |
| JP | 2005-246686 | 9/2005 |

OTHER PUBLICATIONS

Jorgen Bengtsson, "Kinoform Design with an Optimal-Rotation-Angle Method," Applied Optics, Oct. 10, 1994, vol. 33, No. 29, pp. 6879-6884.

H. Takahashi, et al., "Holographic Femtosecond Laser Processing Using Optimal-Rotation-Angle Method with Compensation of Spatial Frequency Response of Liquid Crystal Spatial Light Modulator," Applied Optics, Aug. 10, 2007, vol. 46, No. 23, pp. 5917-5923.

* cited by examiner (a)

|  | Measurement point [nW] | | | | |
| --- | --- | --- | --- | --- | --- |
|  | 1 | 2 | 3 | 4 | 5 |
| 2-point machining | 2200 | 2150 | — | — | — |
| 4-point machining | 1100 | 1120 | 1075 | 1095 | — |

*Fig.20*

|  | Measurement point [nW] | | | | |
| --- | --- | --- | --- | --- | --- |
|  | 1 | 2 | 3 | 4 | 5 |
| 2-point machining | 915 | 920 | 910 | 920 | 920 |
| 4-point machining | 910 | 907 | 915 | 915 | 905 |

|            | Laser beam intensity [nW] |
|------------|---------------------------|
| Pattern A  | 915                       |
| Pattern B  | 920                       |
| Pattern C  | 910                       |
| Pattern D  | 907                       |

LASER MACHINING DEVICE WITH A CONVERGED LASER BEAM AND LASER MACHINING METHOD

TECHNICAL FIELD

The present invention relates to a device and method for machining an object to be machined by irradiating a machining region in the object with a converged laser beam.

BACKGROUND ART

An object to be machined can be machined by converging a laser beam outputted from a laser light source through a converging optical system and irradiating the object with thus converged laser beam. The object can be machined into a desirable form by scanning a laser beam at a single converging position if the laser beam is converged by using a lens alone. However, it takes a long time for machining in this case.

The easiest technique for reducing the machining time is performing multipoint simultaneous machining by emitting converged laser beams at a plurality of converging positions. The multipoint simultaneous machining can be carried out by using a plurality of laser light sources and converging the respective laser beams outputted from the laser light sources through lenses, for example. In this case, however, the use of a plurality of laser light sources increases their cost and complicates their installation area and optical systems.

An invention aimed at solving such a problem is disclosed in Patent Literature 1. The invention disclosed in Patent Literature 1 causes a phase-modulating spatial light modulator to display a hologram, so as to phase-modulate a laser beam outputted from a single laser light source, and irradiates a plurality of positions simultaneously with thus phase-modulated laser beam converged through a converging optical system. The hologram displayed in the spatial light modulator has such a phase modulation distribution as to converge the laser beam at a plurality of converging positions through the converging optical system.
Patent Literature 1: Japanese Patent Publication No. 2723798

DISCLOSURE OF INVENTION

Technical Problem

In the invention disclosed in Patent Literature 1, it is desirable for laser beams irradiating the plurality of converging positions to have uniform energy. In this case, the energy of the laser beam irradiating each converging position is substantially in inverse proportion to the number of converging positions. For example, the energy per converging position of a laser beam irradiating two converging positions is half that irradiating a single converging position.

On the other hand, abrasion rate has been known to vary depending on the laser light intensity when metal surfaces are machined by abrasion with femtosecond laser beams. That is, as the number of converging positions varies in the invention disclosed in Patent Literature 1, the energy of the laser beam irradiating each converging position fluctuates, thereby changing the degree of machining at each converging position.

For solving such a problem, ND (Neutral Density) filters having desirable attenuation factors may be inserted according to the number of converging positions such that the energy of the laser beam irradiating each converging position is kept constant regardless of the number of converging positions. Replacing the ND filters each time the number of converging positions changes, however, will remarkably lower the efficiency.

For overcoming the problems mentioned above, it is an object of the present invention to provide a device and method for machining a machining region in an object to be machined by irradiating a plurality of converging positions or a converging region having a fixed area simultaneously with a laser beam while using a phase-modulating spatial light modulator displaying a hologram, which can easily keep the energy of the laser beam irradiating each converging position or converging region substantially constant even when the number of converging positions or the area of the converging region varies.

Solving Means

The laser machining device in accordance with the present invention is a device for machining an object to be machined by irradiating a machining region in the object with a converged laser beam, the device comprising (1) a laser light source for outputting a laser beam; (2) a phase-modulating spatial light modulator for inputting the laser beam outputted from the laser light source, displaying a hologram modulating a phase of the laser beam at each of a plurality of pixels arranged two-dimensionally, and outputting the phase-modulated laser beam; (3) a converging optical system disposed downstream of the spatial light modulator; and (4) a controller for causing the spatial light modulator to display such a hologram that the laser beam outputted from the spatial light modulator is converged at a plurality of converging positions by the converging optical system. Further, the controller causes the spatial light modulator to display a plurality of holograms sequentially and, when the laser beam outputted from the spatial light modulator displaying each of the plurality of holograms is fed into the converging optical system, lets the converging optical system converge the laser beam at converging positions having a fixed number of M, selectively places N converging positions out of the M converging positions into the machining region, and machines the object. Here, M is an integer of 2 or greater, and N is an integer of at least 1 but less than M.

In the present invention, a laser beam outputted from the spatial light modulator displaying each of a plurality of holograms and fed into the converging optical system is converged by the converging optical system at converging positions having a fixed number of M, while N converging positions out of the M converging positions are selectively placed in the machining region. However, as will be explained later, a shielding member disposed between the converging optical system and object keeps the remaining (M−N) converging positions from being placed in the machining region. Alternatively, a shielding member or mirror used together with a 4f optical system disposed between the spatial light modulator and converging optical system achieves the same result.

Preferably, the laser machining device in accordance with the present invention further comprises a shielding member for blocking the laser beam such that the (M−N) converging positions out of the M converging positions formed by the converging optical system excluding the N converging positions are kept from being placed in the machining region.

Preferably, in the laser machining device in accordance with the present invention, the number M equals the maximum number L of converging positions for machining a predetermined part of the object. Here, L is an integer.

Preferably, in the laser machining device in accordance with the present invention, the number M is greater than the maximum number L of converging positions for machining a predetermined part of the object, while the controller causes the spatial light modulator to display the hologram such that the (M−L) converging positions out of the M converging positions excluding the maximum number L of converging positions are always kept from being placed in the machining region. Here, L is an integer.

Preferably, in the laser machining device in accordance with the present invention, the controller causes the spatial light modulator to display the hologram such that the laser beam converged at the (M−N) or (M−L) converging positions has a variable intensity.

Preferably, the laser machining device in accordance with the present invention further comprises a 4f optical system, disposed between the spatial light modulator and converging optical system, including first and second lenses and a shielding member disposed between the first and second lenses, while the shielding member blocks the laser beam such that the (M−N) converging positions out of the M converging positions formed by the converging optical system excluding the N converging positions are kept from being placed in the machining region.

Preferably, the laser machining device in accordance with the present invention further comprises a 4f optical system, disposed between the spatial light modulator and converging optical system, including first and second lenses and a mirror disposed between the first and second lenses, while the mirror reflects the laser beam such that the (M−N) converging positions out of the M converging positions formed by the converging optical system excluding the N converging positions are kept from being placed in the machining region.

Preferably, in the laser machining device in accordance with the present invention, the controller causes the spatial light modulator to display the hologram such that the (M−N) converging positions out of the M converging positions formed by the converging optical system excluding the N converging positions are placed in a region on the outside of the machining region.

Preferably, in the laser machining device in accordance with the present invention, the outside region is a space above the object.

Preferably, in the laser machining device in accordance with the present invention, the outside region is a space flanking the object.

Preferably, in the laser machining device in accordance with the present invention, the object is provided with an uninfluential region kept from influencing the machining of the object even when irradiated with the converged laser beam, while the controller causes the spatial light modulator to display the hologram such that the (M−N) converging positions out of the M converging positions formed by the converging optical system excluding the N converging positions are placed in the uninfluential region.

Preferably, the laser machining device in accordance with the present invention further comprises a mover for relatively moving the object, while the controller causes the spatial light modulator to sequentially display a plurality of holograms and makes the mover relatively move the object.

The laser machining method in accordance with the present invention is a method for machining an object to be machined by irradiating a machining region in the object with a converged laser beam, the method using (1) a laser light source for outputting a laser beam; (2) a phase-modulating spatial light modulator for inputting the laser beam outputted from the laser light source, displaying a hologram modulating a phase of the laser beam at each of a plurality of pixels arranged two-dimensionally, and outputting the phase-modulated laser beam; (3) a converging optical system disposed downstream of the spatial light modulator; and (4) a controller for causing the spatial light modulator to display such a hologram that the laser beam outputted from the spatial light modulator is converged at a plurality of converging positions by the converging optical system. Further, the controller causes the spatial light modulator to display a plurality of holograms sequentially and, when the laser beam outputted from the spatial light modulator displaying each of the plurality of holograms is fed into the converging optical system, lets the converging optical system converge the laser beam at converging positions having a fixed number of M, selectively places N converging positions out of the M converging positions into the machining region, and machines the object Here, M is an integer of 2 or greater, and N is an integer of at least 1 but less than M.

Preferably, the laser machining method in accordance with the present invention further uses a shielding member for blocking the laser beam such that the (M−N) converging positions out of the M converging positions formed by the converging optical system excluding the N converging positions are kept from being placed in the machining region.

Preferably, in the laser machining method in accordance with the present invention, the number M equals the maximum number L of converging positions for machining a predetermined part of the object.

Preferably, in the laser machining method in accordance with the present invention, the number M is greater than the maximum number L of converging positions for machining a predetermined part of the object, while the controller causes the spatial light modulator to display the hologram such that the (M−L) converging positions out of the M converging positions excluding the maximum number L of converging positions are always kept from being placed in the machining region.

Preferably, in the laser machining method in accordance with the present invention, the controller causes the spatial light modulator to display the hologram such that the laser beam converged at the (M−N) or (M−L) converging positions has a variable intensity.

Preferably, the laser machining method in accordance with the present invention further uses a 4f optical system, disposed between the spatial light modulator and converging optical system, including first and second lenses and a shielding member disposed between the first and second lenses, while the shielding member blocks the laser beam such that the (M−N) converging positions out of the M converging positions formed by the converging optical system excluding the N converging positions are kept from being placed in the machining region.

Preferably, the laser machining method in accordance with the present invention further uses a 4f optical system, disposed between the spatial light modulator and converging optical system, including first and second lenses and a mirror disposed between the first and second lenses, while the mirror reflects the laser beam such that the (M−N) converging positions out of the M converging positions formed by the converging optical system excluding the N converging positions are kept from being placed in the machining region.

Preferably, when a laser having a high peak power such as a femtosecond laser is used, the 4f optical system is held in a vacuum state in order to prevent air breakdown.

Preferably, in the laser machining method in accordance with the present invention, the controller causes the spatial light modulator to display the hologram such that the (M−N) converging positions out of the M converging positions formed by the converging optical system excluding the N converging positions are placed in a region on the outside of the machining region.

Preferably, in the laser machining method in accordance with the present invention, the outside region is a space above the object.

Preferably, in the laser machining method in accordance with the present invention, the outside region is a space flanking the object.

Preferably, in the laser machining method in accordance with the present invention, the object is provided with an uninfluential region kept from influencing the machining of the object even when irradiated with the converged laser beam, while the controller causes the spatial light modulator to display the hologram such that the (M−N) converging positions out of the M converging positions formed by the converging optical system excluding the N converging positions are placed in the uninfluential region.

Preferably, the laser machining method in accordance with the present invention further uses a mover for relatively moving the object, while the controller causes the spatial light modulator to sequentially display a plurality of holograms and makes the mover relatively move the object.

The laser machining device in accordance with the present invention is a device for machining an object to be machined by irradiating a machining region in the object with a converged laser beam, the device comprising (1) a laser light source for outputting a laser beam; (2) a phase-modulating spatial light modulator for inputting the laser beam outputted from the laser light source, displaying a hologram modulating a phase of the laser beam at each of a plurality of pixels arranged two-dimensionally, and outputting the phase-modulated laser beam; (3) a converging optical system disposed downstream of the spatial light modulator; and (4) a controller for causing the spatial light modulator to display such a hologram that the laser beam outputted from the spatial light modulator is converged into a predetermined converging region by the converging optical system. Further, the controller causes the spatial light modulator to display a plurality of holograms sequentially and, when the laser beam outputted from the spatial light modulator displaying each of the plurality of holograms is fed into the converging optical system, lets the converging optical system converge the laser beam into a converging region having a fixed area X, selectively places a converging region having an area Y out of the converging region having the area X into the machining region, and machines the object. Here, X is a positive number, and Y is a positive number not greater than X.

In the present invention, a laser beam outputted from the spatial light modulator displaying each of a plurality of holograms and fed into the converging optical system is converged by the converging optical system into a converging region having a fixed area X, while a converging region having an area Y out of the converging region having the area X is selectively placed in the machining region. However, as will be explained later, a shielding member disposed between the converging optical system and object keeps the remaining (M−N) converging positions from being placed in the machining region. Alternatively, a shielding member or mirror used together with a 4f optical system disposed between the spatial light modulator and converging optical system achieves the same result.

Preferably, the laser machining device in accordance with the present invention further comprises a shielding member for blocking the laser beam such that the converging region having the area (X−Y) out of the converging region having the area X formed by the converging optical system excluding the converging region having the area Y is kept from being placed in the machining region.

Preferably, in the laser machining device in accordance with the present invention, the area X equals the maximum area Z of the converging region for machining a predetermined part of the object. Here, Z is a positive number.

Preferably, in the laser machining device in accordance with the present invention, the area X is greater than the maximum area Z of the converging region for machining a predetermined part of the object, while the controller causes the spatial light modulator to display the hologram such that the converging region having the area (X−Z) out of the converging region having the area X excluding the converging region having the maximum area Z is always kept from being placed in the machining region. Here, Z is a positive number.

Preferably, in the laser machining device in accordance with the present invention, the controller causes the spatial light modulator to display the hologram such that the laser beam converged into the converging region having the area (X−Y) or (X−Z) has a variable intensity.

Preferably, the laser machining device in accordance with the present invention further comprises a 4f optical system, disposed between the spatial light modulator and converging optical system, including first and second lenses and a shielding member disposed between the first and second lenses, while the shielding member blocks the laser beam such that the converging region having the area (X−Y) out of the converging region having the area X formed by the converging optical system excluding the converging region having the area Y is kept from being placed in the machining region.

Preferably, the laser machining device in accordance with the present invention further comprises a 4f optical system, disposed between the spatial light modulator and converging optical system, including first and second lenses and a mirror disposed between the first and second lenses, while the mirror reflects the laser beam such that the converging region having the area (X−Y) out of the converging region having the area X formed by the converging optical system excluding the converging region having the area Y is kept from being placed in the machining region.

Preferably, in the laser machining device in accordance with the present invention, the controller causes the spatial light modulator to display the hologram such that the converging region having the area (X−Y) out of the converging region having the area X formed by the converging optical system excluding the converging region having the area Y is placed in a region on the outside of the machining region.

Preferably, in the laser machining device in accordance with the present invention, the outside region is a space above the object.

Preferably, in the laser machining device in accordance with the present invention, the outside region is a space flanking the object.

Preferably, in the laser machining device in accordance with the present invention, the object is provided with an uninfluential region kept from influencing the machining of the object even when irradiated with the converged laser beam, while the controller causes the spatial light modulator to display the hologram such that the converging region having the area (X−Y) out of the converging region having the area X formed by the converging optical system excluding the converging region having the area Y is placed in the uninfluential region.

Preferably, the laser machining device in accordance with the present invention further comprises a mover for relatively moving the object, while the controller causes the spatial light modulator to sequentially display a plurality of holograms and makes the mover relatively move the object.

The laser machining method in accordance with the present invention is a method for machining an object to be machined by irradiating a machining region in the object with a converged laser beam, the method using (1) a laser light source for outputting a laser beam; (2) a phase-modulating spatial light modulator for inputting the laser beam outputted from the laser light source, displaying a hologram modulating a phase of the laser beam at each of a plurality of pixels arranged two-dimensionally, and outputting the phase-modulated laser beam; (3) a converging optical system disposed downstream of the spatial light modulator; and (4) a controller for causing the spatial light modulator to display such a hologram that the laser beam outputted from the spatial light modulator is converged into a predetermined converging region by the converging optical system. Further, the controller causes the spatial light modulator to display a plurality of holograms sequentially and, when the laser beam outputted from the spatial light modulator displaying each of the plurality of holograms is fed into the converging optical system, lets the converging optical system converge the laser beam into a converging region having a fixed area X, selectively places a converging region having an area Y out of the converging region having the area X into the machining region, and machines the object. Here, X is a positive number, and Y is a positive number not greater than X.

Preferably, the laser machining method in accordance with the present invention further uses a shielding member for blocking the laser beam such that the converging region having the area (X−Y) out of the converging region having the area X formed by the converging optical system excluding the converging region having the area Y is kept from being placed in the machining region.

Preferably, in the laser machining method in accordance with the present invention, the area X equals the maximum area Z of the converging region for machining a predetermined part of the object. Here, Z is a positive number.

Preferably, in the laser machining method in accordance with the present invention, the area X is greater than the maximum area Z of the converging region for machining a predetermined part of the object, while the controller causes the spatial light modulator to display the hologram such that the converging region having the area (X−Z) out of the converging region having the area X excluding the converging region having the maximum area Z is always kept from being placed in the machining region. Here, Z is a positive number.

Preferably, in the laser machining method in accordance with the present invention, the controller causes the spatial light modulator to display the hologram such that the laser beam converged into the converging region having the area (X−Y) or (X−Z) has a variable intensity.

Preferably, the laser machining method in accordance with the present invention further uses a 4f optical system, disposed between the spatial light modulator and converging optical system, including first and second lenses and a shielding member disposed between the first and second lenses, while the shielding member blocks the laser beam such that the converging region having the area (X−Y) out of the converging region having the area X formed by the converging optical system excluding the converging region having the area Y is kept from being placed in the machining region.

Preferably, the laser machining method in accordance with the present invention further uses a 4f optical system, disposed between the spatial light modulator and converging optical system, including first and second lenses and a mirror disposed between the first and second lenses, while the mirror reflects the laser beam such that the converging region having the area (X−Y) out of the converging region having the area X formed by the converging optical system excluding the converging region having the area Y is kept from being placed in the machining region.

Preferably, in the laser machining method in accordance with the present invention, the controller causes the spatial light modulator to display the hologram such that the converging region having the area (X−Y) out of the converging region having the area X formed by the converging optical system excluding the converging region having the area Y is placed in a region on the outside of the machining region.

Preferably, in the laser machining method in accordance with the present invention, the outside region is a space above the object.

Preferably, in the laser machining method in accordance with the present invention, the outside region is a space flanking the object.

Preferably, in the laser machining method in accordance with the present invention, the object is provided with an uninfluential region kept from influencing the machining of the object even when irradiated with the converged laser beam, while the controller causes the spatial light modulator to display the hologram such that the converging region having the area (X−Y) out of the converging region having the area X formed by the converging optical system excluding the converging region having the area Y is placed in the uninfluential region.

Preferably, the laser machining method in accordance with the present invention further uses a mover for relatively moving the object, while the controller causes the spatial light modulator to sequentially display a plurality of holograms and makes the mover relatively move the object.

Effects of Invention

The laser machining device or method in accordance with the present invention can machine a machining region in an object to be machined by irradiating a plurality of converging positions or a converging region having a fixed area simultaneously with a laser beam while using a phase-modulating spatial light modulator displaying a hologram, and can easily keep the energy of the laser beam irradiating each converging position or converging region substantially constant even when the number of converging positions or the area of the converging region varies.

BRIEF DESCRIPTION OF DRAWINGS

FIG. 19 is a chart listing laser beam intensities at respective converging positions in a comparative example in the description of Example 1;

FIG. 20 is a chart listing laser beam intensities at respective converging positions in Example 1;

FIG. 32 is a chart listing laser beam intensities at respective converging positions in Example 2.

REFERENCE SIGNS LIST 1 to 5 . . . laser machining device; 10 . . . laser light source; 11 . . . spatial filter; 12 . . . collimator lens; 13, 14 . . . mirror; 20 . . . spatial light modulator; 21 . . . driver; 22 . . . controller; 30 . . . converging optical system; 40 . . . shielding member; 50 . . . 4f optical system; 51, 52 . . . lens; 53 . . . shielding member; 54 . . . mirror; 55 . . . damper; 60 . . . mover; 90 . . . object to be machined; 91 . . . machining region

DESCRIPTION OF EMBODIMENTS

In the following, the best modes for carrying out the present invention will be explained in detail with reference to the accompanying drawings. In the explanation of the drawings, the same constituents will be referred to with the same signs while omitting their overlapping descriptions.

First Embodiment

Structure of a Laser Machining Device 1

Figure 1:
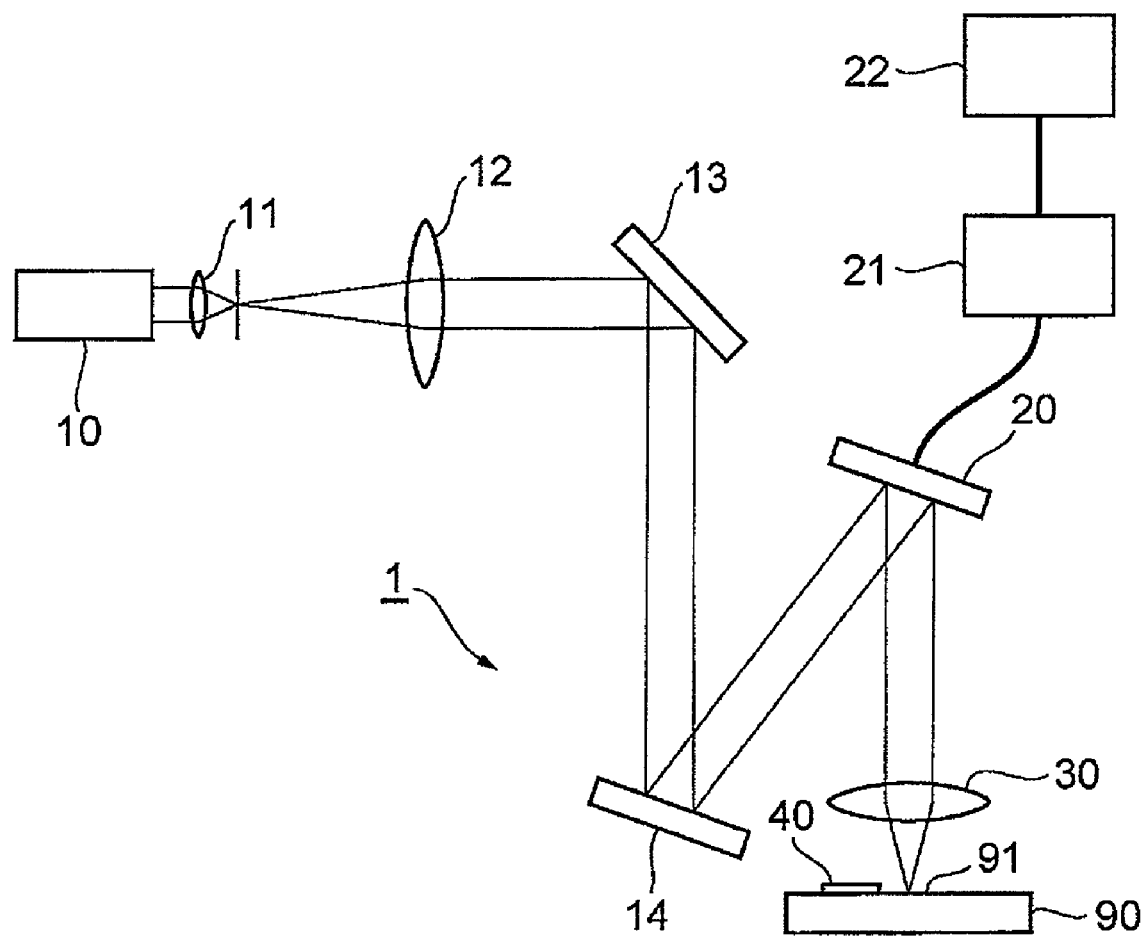
FIG. 1 is a diagram illustrating a laser machining device 1 in accordance with a first embodiment.

To begin with, a first embodiment of the laser machining device and method in accordance with the present invention will be explained. FIG. 1 is a diagram illustrating the structure of the laser machining device 1 in accordance with the first embodiment. The laser machining device 1 illustrated in this drawing, which is a device for machining an object to be machined 90 by irradiating a machining region in the object 90 with a converged laser beam, comprises a laser light source 10, a spatial filter 11, a collimator lens 12, mirrors 13, 14, a spatial light modulator 20, a driver 21, a controller 22, a converging optical system 30, and a shielding member 40.

The laser light source 10, which outputs a laser beam for irradiating the machining region 91 of the object 90, is preferably a pulsed laser source such as a femtosecond laser light source or Nd:YAG laser light source. The laser beam outputted from the laser light source 10 is transmitted through the spatial filter 11, collimated by the collimator lens 12, and reflected by the mirrors 13, 14, so as to be fed into the spatial light modulator 20.

The spatial light modulator 20, which is of phase modulation type, inputs the laser beam outputted from the laser light source 10, displays a hologram modulating a phase of the laser beam at each of a plurality of pixels arranged two-dimensionally, and outputs the phase-modulated laser beam. The phase hologram displayed by the spatial light modulator 20 is preferably a hologram (CGH: Computer Generated Hologram) obtained by numerical computing.

The spatial light modulator 20 is any of reflection and transmission types. The spatial light modulator 20 of reflection type may be any of LCOS (Liquid Crystal on Silicon), MEM (Micro Electro Mechanical Systems), and light-addressable types. The spatial light modulator 20 of transmission type may be an LCD (Liquid Crystal Display) and the like. FIG. 1 illustrates the spatial light modulator 20 of reflection type.

The driver 21, which sets the amount of phase modulation at each of a plurality of pixels arranged two-dimensionally in the spatial light modulator 20, provides the spatial light modulator 20 with a signal for setting the amount of phase modulation for each pixel. The driver 21 sets the amount of phase modulation at each of a plurality of pixels arranged two-dimensionally in the spatial light modulator 20, thereby causing the spatial light modulator 20 to display a hologram.

The converging optical system 30, which is disposed downstream of the spatial light modulator 20, inputs the laser beam outputted from the spatial light modulator 20 after being phase-modulated per pixel therein. In particular, the converging optical system 30 includes a lens for Fourier-transforming the laser beam outputted from the spatial light modulator 20. Thus Fourier-transformed image is formed on the back focal plane of the Fourier-transforming lens.

The controller 22, which is constructed by a computer, for example, controls the operation of the driver 21, thereby causing the driver 21 to write a hologram into the spatial light modulator 20. Here, the controller 22 causes the spatial light modulator 20 to display a hologram by which the laser beam outputted from the spatial light modulator 20 is converged at a plurality of converging positions through the converging optical system 30.

In particular, the controller 22 causes the spatial light modulator 20 to display a plurality of holograms sequentially in this embodiment. Then, the controller 22 lets the converging optical system 30 converge the laser beam outputted from the spatial light modulator 20 displaying each of a plurality of holograms at converging positions having a fixed number of M, selectively places N converging positions out of the M converging positions into the machining region 91, and machines the object 90. Here, M is an integer of 2 or greater, and N is an integer of at least 1 but less than M. The machining region 91 where the N converging positions are placed includes not only the front face of the object 90 but also the inside thereof.

The shielding member 40 blocks the laser beam such that the (M−N) converging positions out of the M converging positions formed by the converging optical system 30 excluding the N converging positions are kept from being placed in the machining region 90.

Figure 2:
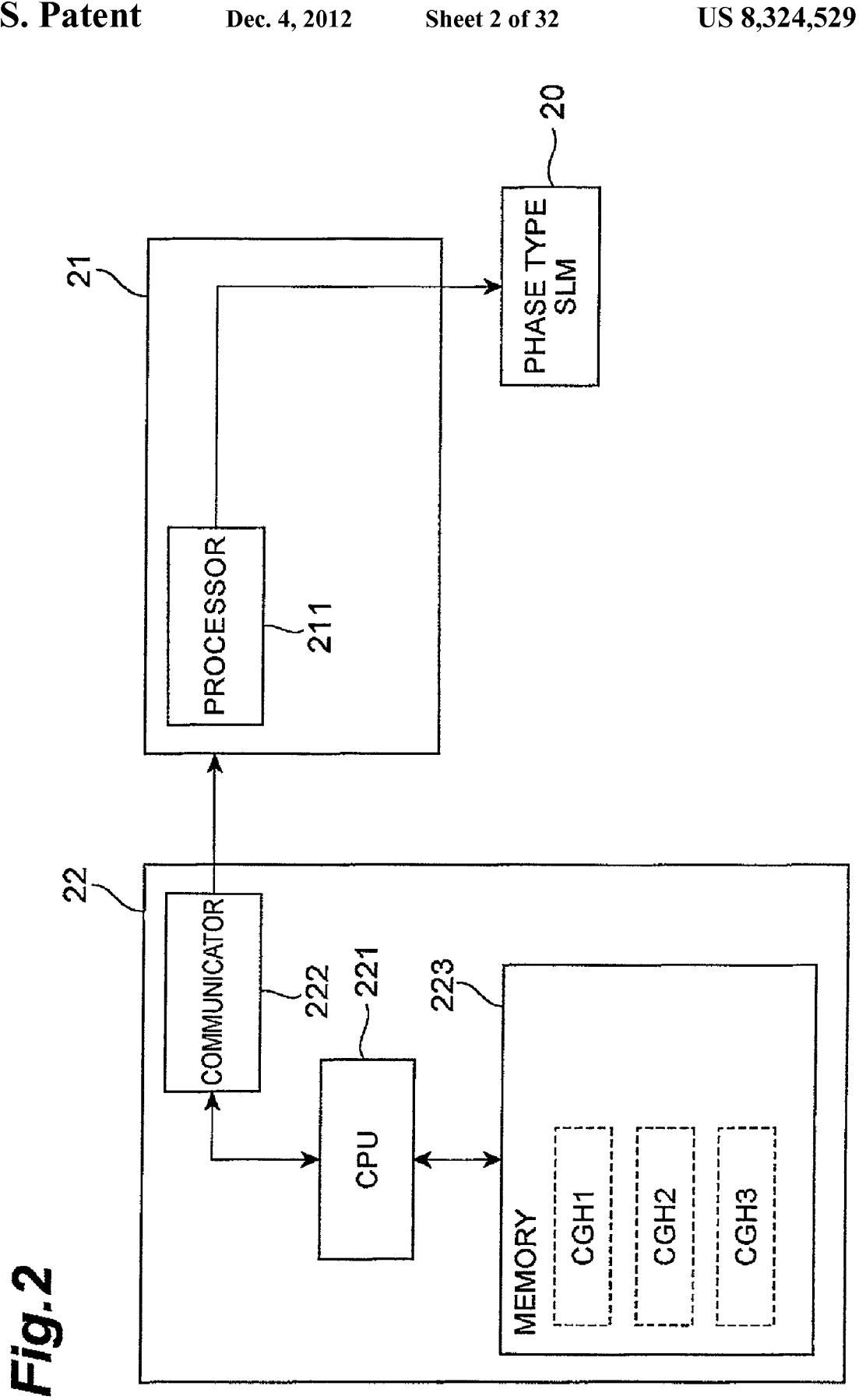
FIG. 2 is a diagram explaining a first mode in which a controller 22 causes a driver 21 to write a hologram into a spatial light modulator 20 in the laser machining device 1 in accordance with the first embodiment.
Figure 3:
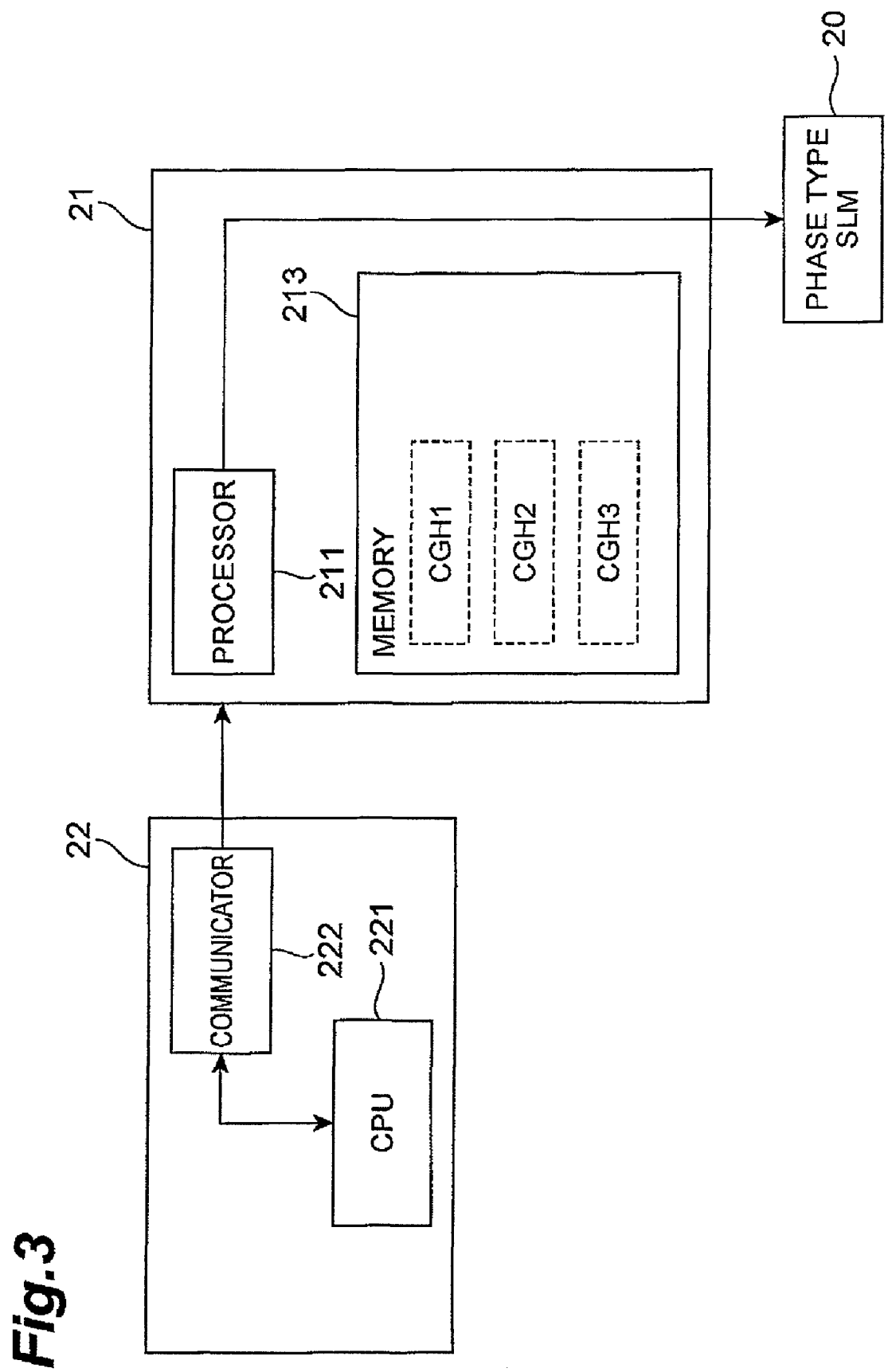
FIG. 3 is a diagram explaining a second mode in which the controller 22 causes the driver 21 to write a hologram into the spatial light modulator 20 in the laser machining device 1 in accordance with the first embodiment.
Figure 4:
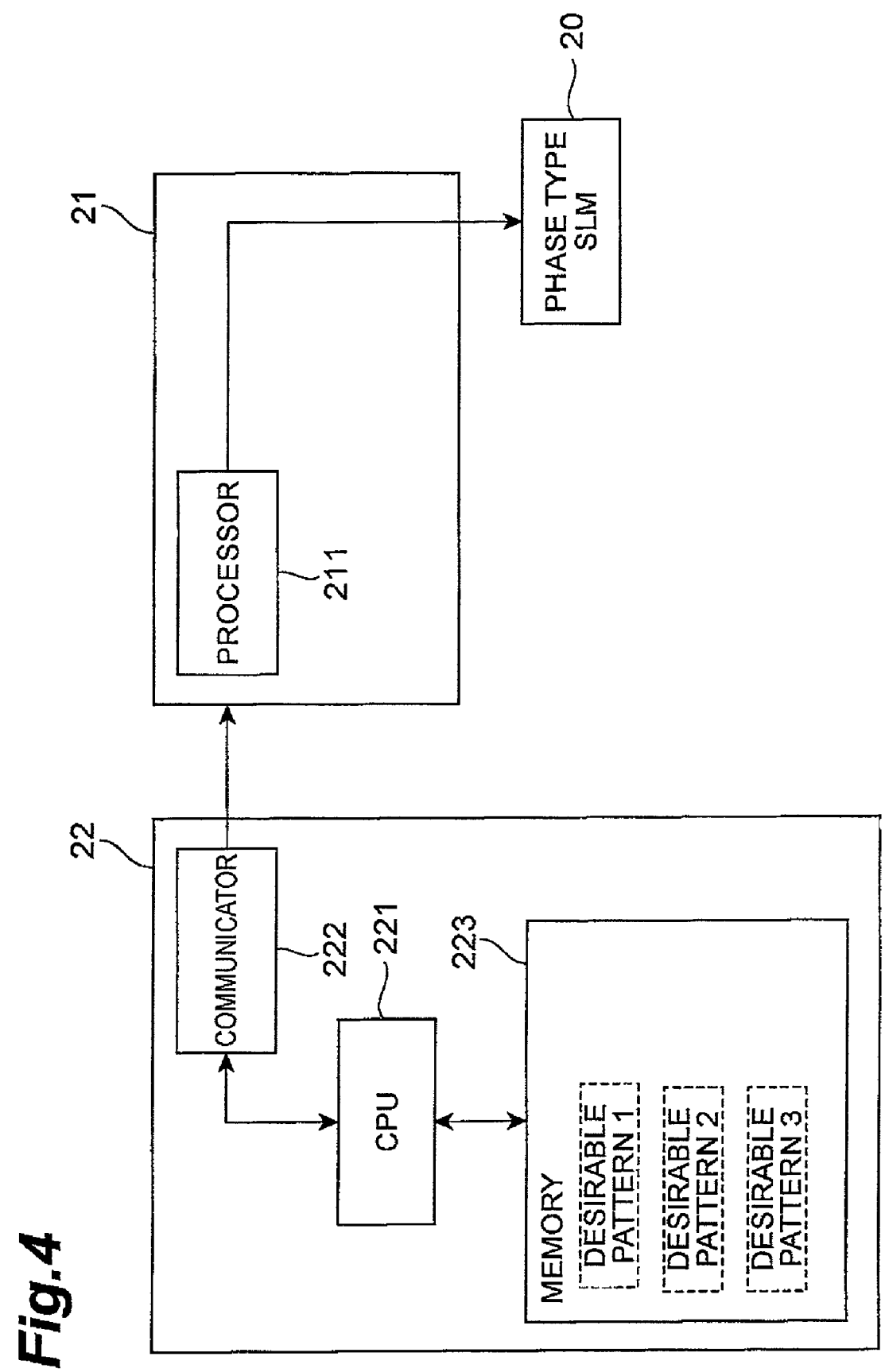
FIG. 4 is a diagram explaining a third mode in which the controller 22 causes the driver 21 to write a hologram into the spatial light modulator 20 in the laser machining device 1 in accordance with the first embodiment.

FIGS. 2 to 4 are diagrams explaining respective modes in which the controller 22 causes the driver 21 to write a hologram into the spatial light modulator 20 in the laser machining device 1 in accordance with the first embodiment.

In the first mode illustrated in FIG. 2, the controller 22 includes a central processing unit 221, a communicator 222, and a memory 223. The central processing unit 221 prepares data for a plurality of holograms CGH1 to CGH3 to be displayed by the spatial light modulator 20 and stores them in the memory 223. When letting the spatial light modulator 20 display a hologram, the central processing unit 221 reads the data for the hologram from the memory 223 and sends thus read hologram data to the communicator 222, and the communicator 222 transmits the hologram data to the processor 211 of the driver 21. The processor 211 of the driver 21 sends the hologram data received from the controller 22 to the spatial light modulator 20 and causes the spatial light modulator 20 to display the hologram.

In the second mode illustrated in FIG. 3, a memory 213 of the driver 21 stores data for a plurality of holograms CGH1 to CGH3 to be displayed by the spatial light modulator 20. When letting the spatial light modulator 20 display a hologram, the controller 22 designates hologram data stored in the memory 213 for the driver 21, causes the latter to send the hologram data to the spatial light modulator 20, and makes the spatial light modulator 20 display the hologram.

In the third mode illustrated in FIG. 4, the memory 223 included in the controller 22 stores data for desirable patterns 1 to 3 of converging positions for converging the laser beam through the converging optical system 30. When letting the spatial light modulator 20 display a hologram, the central processing unit 221 reads the data for a desirable pattern from the memory 223, creates a hologram which can reproduce thus read desirable pattern, and sends the data for this hologram to the communicator 222, while the communicator 222 transmits the hologram data to the processor 211 of the driver 21. Then, the processor 211 of the driver 21 sends the hologram data received from the controller 22 to the spatial light modulator 20 and causes the spatial light modulator 20 to display the hologram.

Any of the modes illustrated in FIGS. 2 to 4 may create a hologram from a desirable pattern of converging positions according to any of techniques of Fourier transform and Fresnel zone plate types. The Fourier transform type can form the hologram by an algorithm such as a GS method, while the Fresnel zone plate type can form the hologram by an algorithm such as an ORA (optimal-rotation-angle) method.

The GS method is described in R. W. Gerchberg and W. O. Saxton, "A practical algorithm for the determination of phase from image and diffraction plane pictures", Optik, Vol. 35, pp. 237-246 (1972). The ORA method is described in Jorgen Bengtsson, "Kinoform design with an optimal-rotation-angle method", Applied Optics, Vol. 33, no. 29, pp. 6879-6884 (1994).

Laser Machining Method

The operation of the laser machining device 1 in accordance with the first embodiment and the laser machining method in accordance with the first embodiment will now be explained in comparison with a comparative example. Here, the machining region 91 of the object 90 is irradiated with a converged laser beam, so as to machine the object 90 such that three alphabetical letters of "H", "P", and "K" are displayed in a multipoint scheme.

Laser Machining Method: Comparative Example

Figure 5:
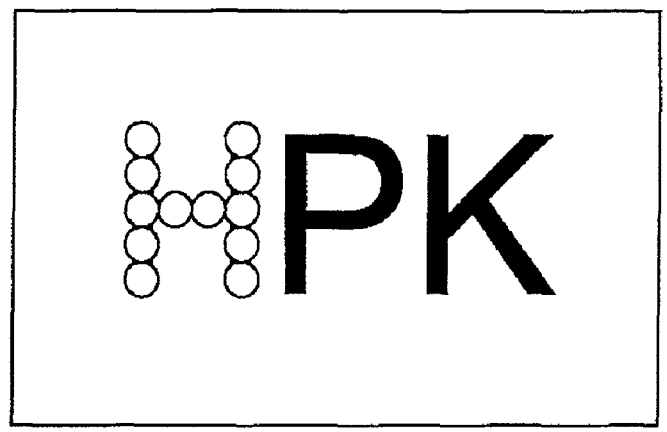
FIG. 5 is a diagram explaining a laser machining method of a comparative example in the description of the first embodiment.
Figure 5:
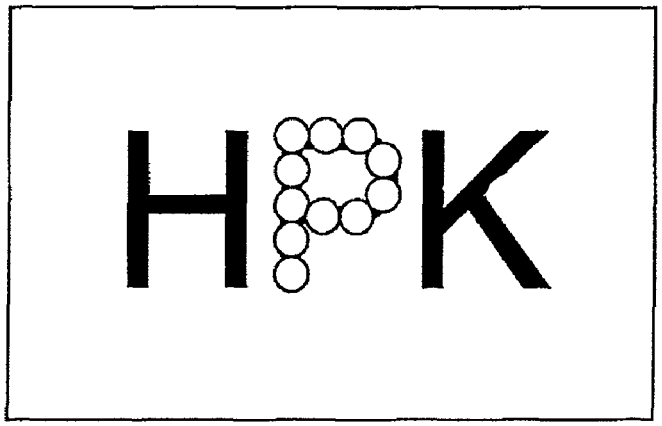
Figure 5:
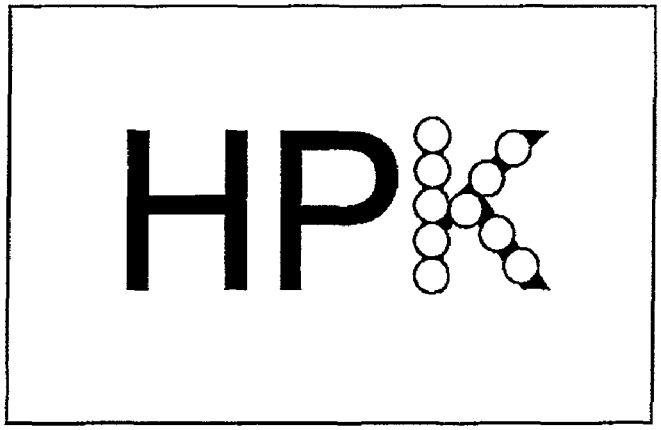

FIG. 5 is a diagram explaining a laser machining method of a comparative example. In each of (a) to (c) in this diagram, circles indicate respective laser beam converging positions. FIG. 5(a) illustrates how the laser beam irradiates 12 converging positions in order to machine letter "H". FIG. 5(b) illustrates how the laser beam irradiates 11 converging positions in order to machine letter "P". FIG. 5(c) illustrates how the laser beam irradiates 10 converging positions in order to machine letter "K".

In this comparative example, respective holograms adapted to machine letters "H", "P", and "K" are sequentially displayed in the spatial light modulator. When thus machining "H", "P", and "K" one by one in this order, the number of laser beam converging positions varies among the letters, so that the laser beam irradiation energy at each converging position differs from letter to letter, thereby causing fluctuations in machining depending on the letters.

In this embodiment, by contrast, the laser beam displaying each of a plurality of holograms outputted from the spatial light modulator 20 is converged by the converging optical system 30 at converging positions having a fixed number of M, while N converging positions out of the M converging positions are selectively placed in the machining region 91, and the object 90 is machined. The shielding member 40 keeps the remaining (M−N) converging positions from being placed in the object 90.

Laser Machining Method: First Mode

Figure 6:
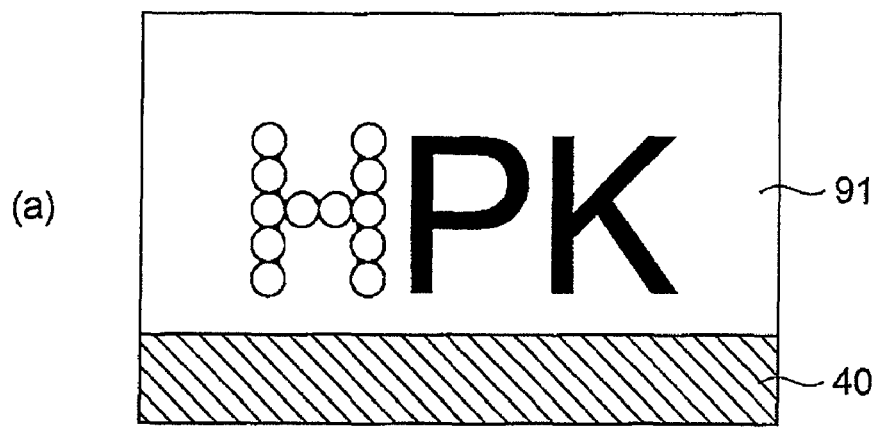
FIG. 6 is a diagram explaining a first mode of the laser machining method in accordance with the first embodiment.
Figure 6:
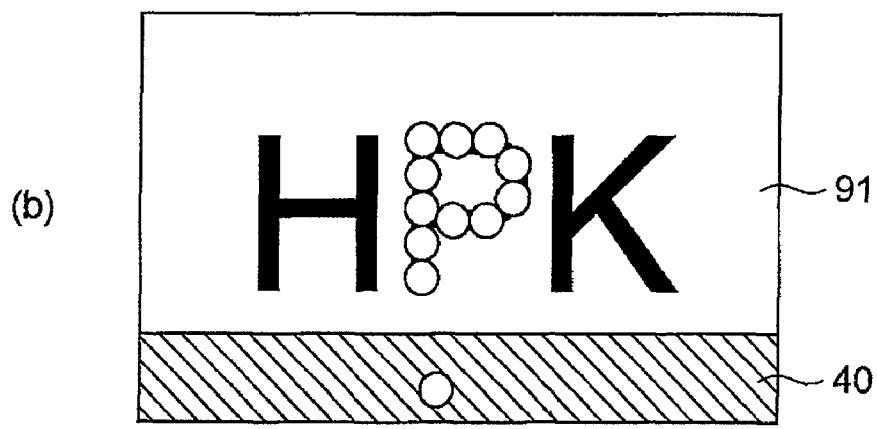
Figure 6:
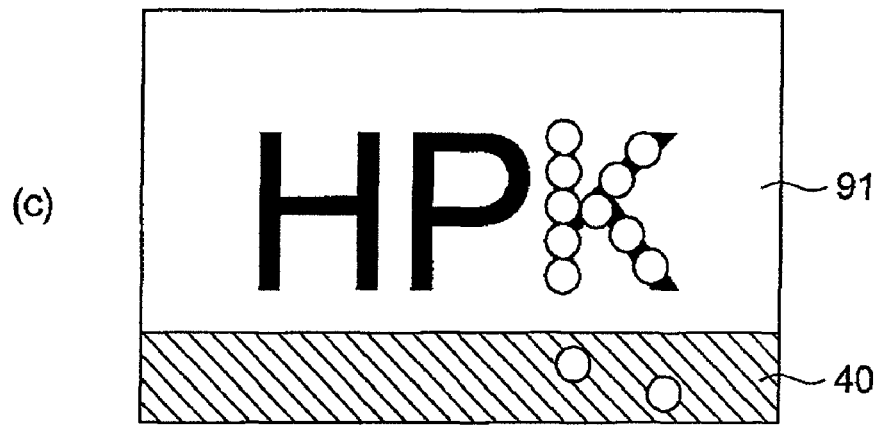

FIG. 6 is a diagram explaining the first mode of the laser machining method in accordance with the first embodiment. FIG. 6(a) illustrates how the laser beam irradiates 12 converging positions in order to machine letter "H". FIG. 6(b) illustrates how the laser beam irradiates 11 converging positions within the machining region 91 in order to machine letter "P" and 1 converging position on the shielding member 40. FIG. 6(c) illustrates how the laser beam irradiates 10 converging positions within the machining region 91 in order to machine letter "K" and 2 converging positions on the shielding member 40.

That is, in the first mode, the laser beam outputted from the spatial light modulator 20 sequentially displaying the respective holograms corresponding to "H", "P", and "K" is converged by the converging optical system 30 at 12 (M) converging positions having a fixed number. When machining letter "H", all of the 12 (M) converging positions are selectively placed in the machining region 91, so as to machine the object 90 (FIG. 6(a)). When machining letter "P", 11 (N) converging positions out of the 12 (M) converging positions are selectively placed in the machining region 91, so as to machine the object 90 (FIG. 6(b)). When machining letter "K", 10 (N) converging positions out of the 12 (M) converging positions are selectively placed in the machining region 91, so as to machine the object 90 (FIG. 6(c)). In FIG. 6, the maximum number L of converging positions for machining the letter "H" part of the object 90 (the part having the greatest number of converging positions required for machining among letters "H", "P", and "K" and corresponding to the "predetermined part" in the claims) is 12, which equals the total of laser beam converging positions M. Here, L is an integer.

Thus, even when letters are machined one by one in the order of "H", "P", and "K", the number of laser beam converging positions is fixed at 12 regardless of the letters, so that the laser beam irradiation energy at each converging position is substantially constant among the letters, whereby fluctuations in machining can be suppressed independently of the letters.

Laser Machining Method: Another Way of the First Mode

Figure 24:
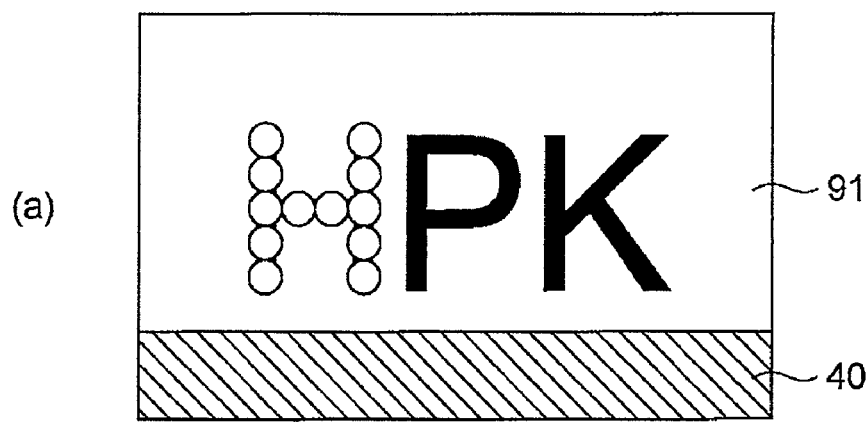
FIG. 24 is a diagram explaining another way of the first mode of the laser machining method in accordance with the first embodiment.
Figure 24:
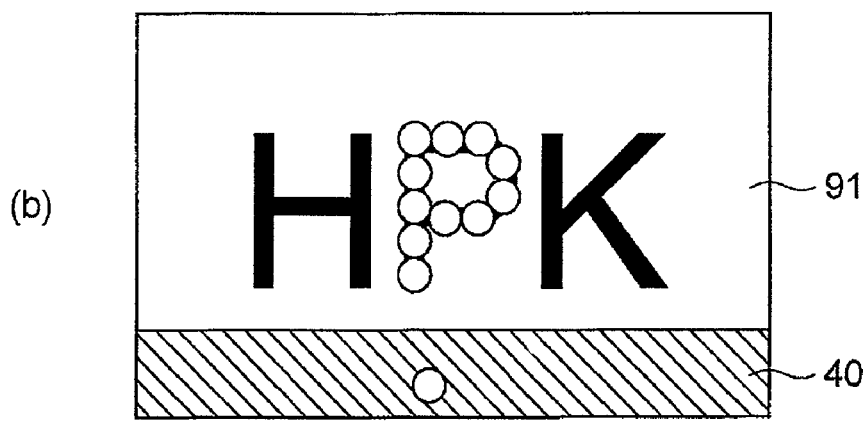
Figure 24:
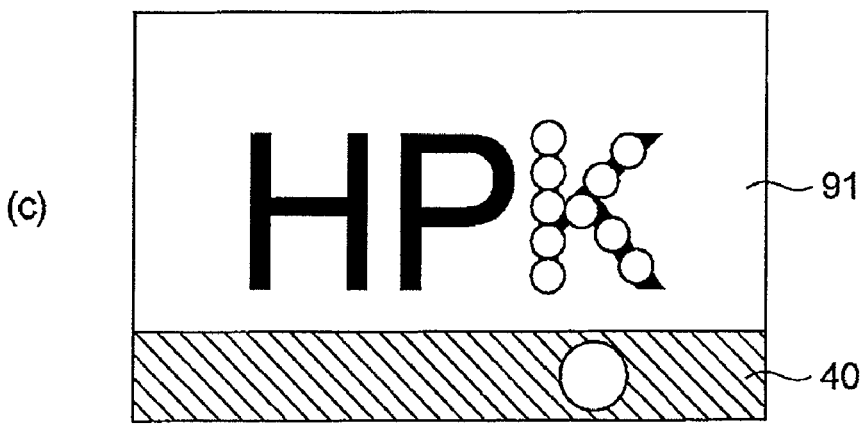

FIG. 24 is a diagram explaining another way of the above-mentioned first mode. This is the same as the first mode explained with reference to FIG. 6 until the laser beam for machining letter "K" irradiates 10 converging positions within the machining region 91, but differs therefrom in that the laser beam irradiates only 1 converging position on the shielding member 40. Here, the intensity of the laser beam irradiating each converging position on the shielding member 40 varies, for example, such that the intensity of the laser beam irradiating the single converging position on the shielding member 40 in FIG. 24(c) is about twice that irradiating each of the 2 converging positions on the shielding member 40 in FIG. 6(c). That is, the intensity of the laser beam irradiating the converging positions on the shielding member 40 is variable. For convenience of explanation, the intensity of laser beams is expressed in proportion to the size of white circles in FIG. 24 (as in FIG. 25 which will be explained later). Such CGH with different intensities can be made by varying amplitudes of target patterns in the GS method, for example.

Figure 25:
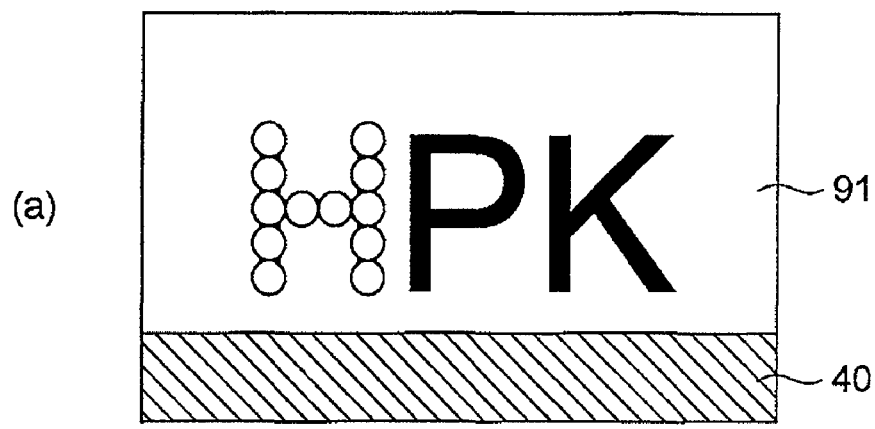
FIG. 25 is a diagram explaining still another way of the first mode of the laser machining method in accordance with the first embodiment.
Figure 25:
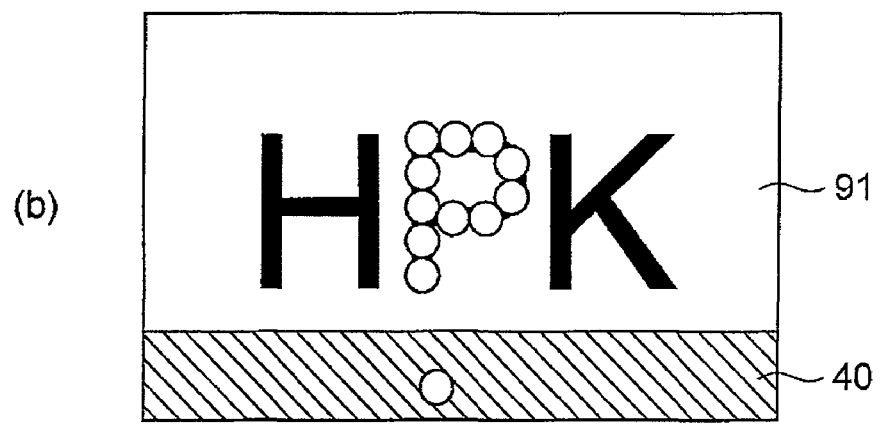
Figure 25:
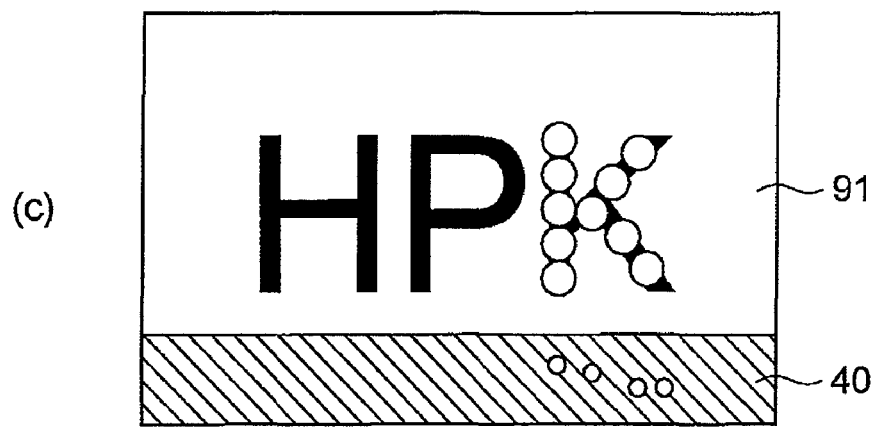

The intensity of the laser beam irradiating the shielding member 40 may not only be raised but lowered as illustrated in FIG. 25(c). This is done in order to prevent the intensity of the laser beam from becoming so high as to machine the shielding member 40. FIG. 25 is a diagram explaining still another way of the first mode, which differs from the first mode of FIG. 6 in that the laser beam irradiates 4 converging positions on the shielding member 40 in FIG. 25(c). Here, the intensity of the laser beam irradiating each of 4 converging positions on the shielding member 40 in FIG. 25(c) is about 0.5 times that of the laser beam irradiating each of 2 converging positions on the shielding member 40 in FIG. 6(c) and lower than a threshold at which the shielding member 40 is machined.

Laser Machining Method: Second Mode

Figure 7:
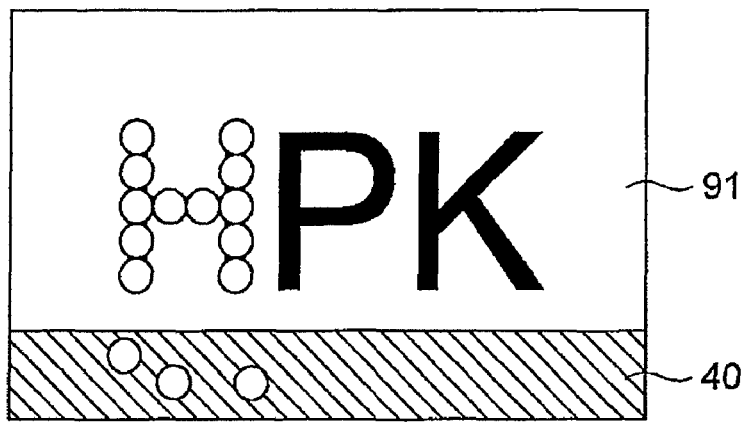
FIG. 7 is a diagram explaining a second mode of the laser machining method in accordance with the first embodiment.
Figure 7:
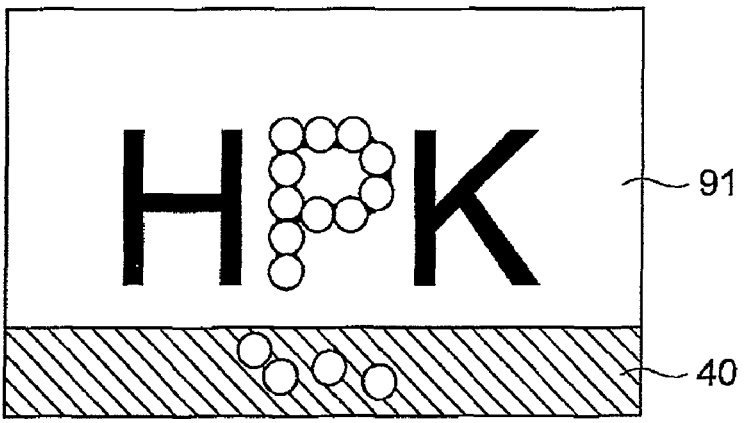
Figure 7:
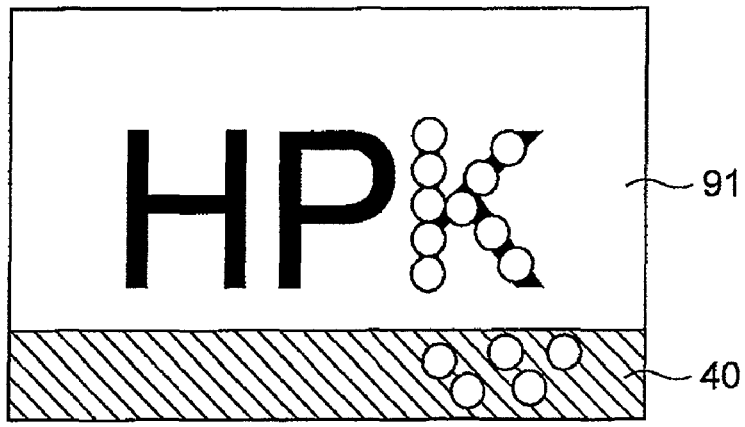

FIG. 7 is a diagram explaining the second mode of the laser machining method in accordance with the first embodiment. FIG. 7(a) illustrates how the laser beam irradiates 12 converging positions within the machining region 91 in order to machine letter "H" and 3 converging positions on the shielding member 40. FIG. 7(b) illustrates how the laser beam irradiates 11 converging positions within the machining region 91 in order to machine letter "P" and 4 converging positions on the shielding member 40. FIG. 7(c) illustrates how the laser beam irradiates 10 converging positions within the machining region 91 in order to machine letter "K" and 5 converging position on the shielding member 40.

That is, in the second mode, the laser beam outputted from the spatial light modulator 20 sequentially displaying the respective holograms corresponding to "H", "P", and "K" is converged by the converging optical system 30 at 15 (M) converging positions having a fixed number. When machining letter "H", 12 (N) converging positions out of the 15 (M) converging positions are selectively placed in the machining region 91, so as to machine the object 90 (FIG. 7(a)). When machining letter "P", 11 (N) converging positions out of the 15 (M) converging positions are selectively placed in the machining region 91, so as to machine the object 90 (FIG. 7(b)). When machining letter "K", 10 (N) converging positions out of the 15 (M) converging positions are selectively placed in the machining region 91, so as to machine the object 90 (FIG. 7(c)).

Thus, even when letters are machined one by one in the order of "H", "P", and "K", the number of laser beam converging positions is fixed at 15 regardless of the letters, so that the laser beam irradiation energy at each converging position is substantially constant among the letters, whereby fluctuations in machining can be suppressed independently of the letters.

In the first mode of the laser machining method illustrated in FIG. 6, the number (M) of converging positions formed by the converging optical system 30 is the maximum number (L) required for machining each of letters "H", "P", and "K". That is, M=L. In the second mode of the laser machining method illustrated in FIG. 7, by contrast, the number (M) of converging positions formed by the converging optical system 30 is 15 that is greater than the above-mentioned maximum number 12 (L). That is, M>L. In the second mode, the controller 22 causes the spatial light modulator 20 to display holograms such that 3 converging positions out of the M (15) converging positions excluding the maximum number L (12) are always kept from being placed in the machining region 91, i.e., are placed on the shielding member 40. The second mode is favorable in that, when the intensity of the laser beam outputted from the laser light source 10 is high, the number M of converging positions formed by each hologram (i.e., the magnitude of laser beam irradiation energy at each converging position) can be set appropriately. In either mode, when machining letters "H", "P", and "K", the number of laser beam converging positions is fixed regardless of the letters, whereby the laser beam irradiation energy at each converging position is substantially constant among the letters.

Laser Machining Method: Third Mode

Figure 8:
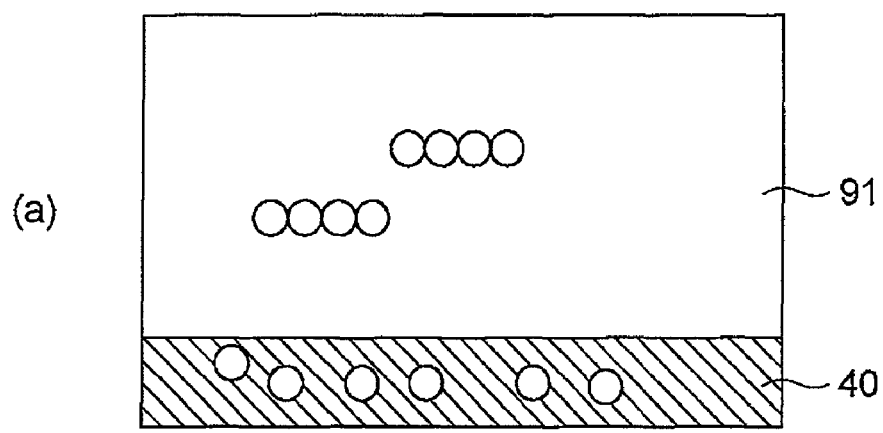
FIG. 8 is a diagram explaining a third mode of the laser machining method in accordance with the first embodiment.
Figure 8:
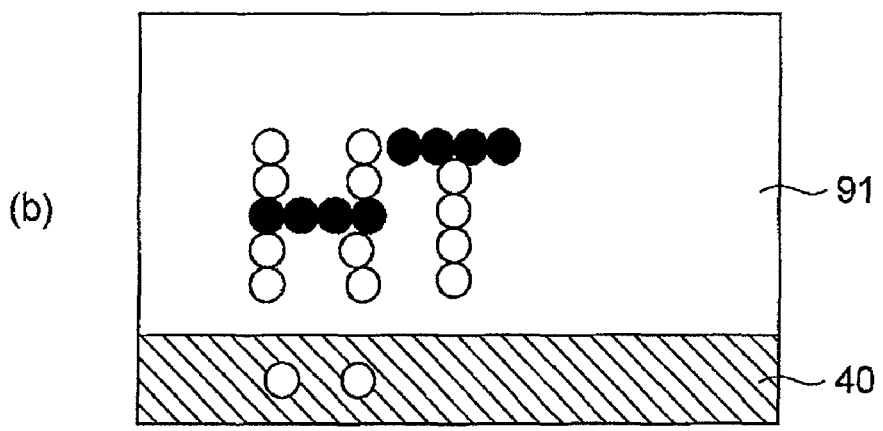
Figure 8:
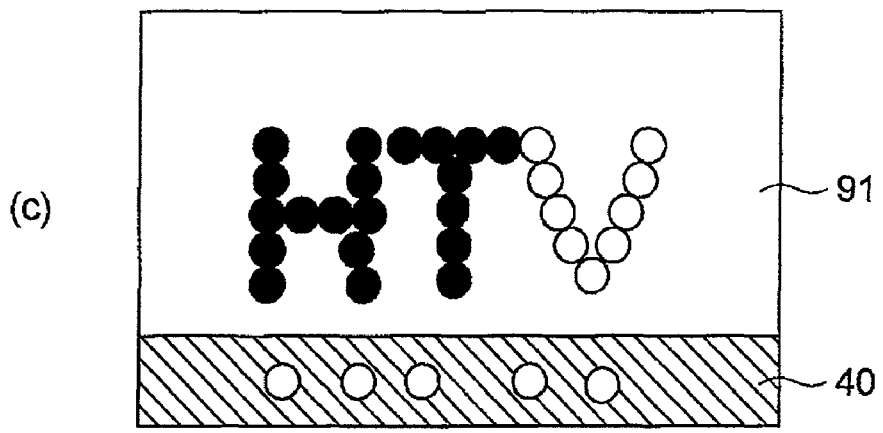

FIG. 8 is a diagram explaining the third mode of the laser machining method in accordance with the first embodiment. In each of (a) to (c) in this diagram, white circles indicate respective laser beam converging positions, while black circles represent already machined positions. Here, the machining region 91 of the object 90 is irradiated with a converged laser beam so as to machine the object 90 such that three alphabetical letters of "H", "T", and "V" are displayed in a multipoint scheme. Letters "H", "T", and "V" are not machined one by one in this order, but each of "H" and "T" is partly machined at first, then the remaining part of each of "H" and "T" is machined, and finally the whole letter "V" is machined.

In the third mode, the laser beam outputted from the spatial light modulator 20 sequentially displaying 3 holograms is converged by the converging optical system 30 at 14 converging positions having a fixed number. When partly machining each of letters "H" and "T", 8 converging positions out of the 14 converging positions are selectively placed in the machining region 91, so as to machine the object 90, while the remaining 6 converging positions are placed on the shielding member 40 (FIG. 8(*a*)). When machining the remaining part of each of letters "H" and "T", 12 converging positions out of the 14 converging positions are selectively placed in the machining region 91, so as to machine the object 90, while the remaining 2 converging positions are placed on the shielding member 40 (FIG. 8(*b*)). When machining letter "V", 9 converging positions out of the 14 converging positions are selectively placed in the machining region 91, so as to machine the object 90, while the remaining 5 converging positions are placed on the shielding member 40 (FIG. 8(*c*)).

Thus, even when letters "H", "T", and "V" are not machined one by one in this order but in a predetermined order, the number of laser beam converging positions is fixed at 14 regardless of the letters, so that the laser beam irradiation energy at each converging position is substantially constant among the letters, whereby fluctuations in machining can be suppressed independently of the letters. The third mode can appropriately set the number of converging positions formed by each hologram (i.e., the magnitude of laser beam irradiation energy at each converging position) according to the intensity of the laser beam outputted from the laser light source 10 independently of letters to be machined.

Laser Machining Method: Fourth Mode

Figure 9:
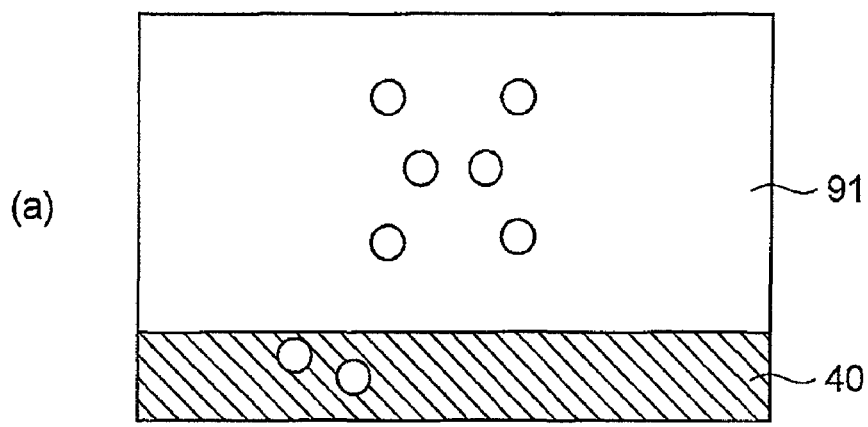
FIG. 9 is a diagram explaining a fourth mode of the laser machining method in accordance with the first embodiment.
Figure 9:
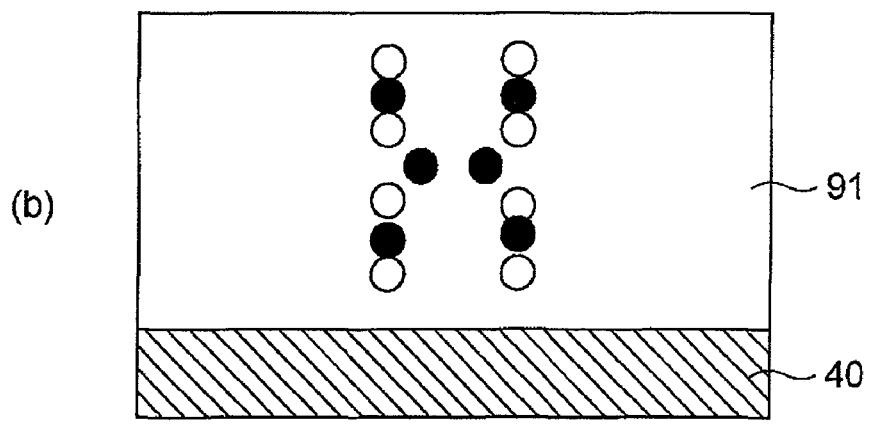
Figure 9:
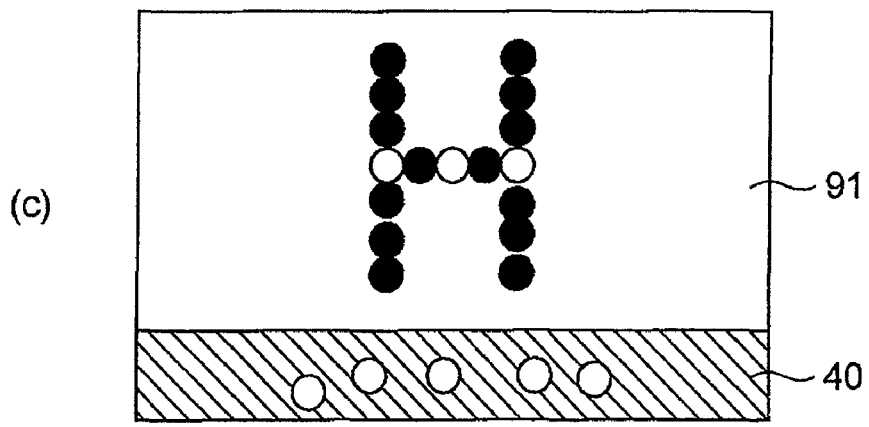

FIG. 9 is a diagram explaining the fourth mode of the laser machining method in accordance with the first embodiment. In each of (a) to (c) in this diagram, white circles indicate respective laser beam converging positions, while black circles represent already machined positions. Here, the machining region 91 of the object 90 is irradiated with a converged laser beam so as to machine the object 90 such that a single alphabetical letter of "H" is displayed in a multipoint scheme. A part of letter "H" is machined at first, then another part thereof is machined, and finally the remaining part thereof is machined.

In the fourth mode, the laser beam outputted from the spatial light modulator 20 sequentially displaying 3 holograms is converged by the converging optical system 30 at 8 converging positions having a fixed number. When machining a part of letter "H", 6 converging positions out of the 8 converging positions are selectively placed in the machining region 91, so as to machine the object 90, while the remaining 2 converging positions are placed on the shielding member 40 (FIG. 9(*a*)). When machining another part of letter "H", all of the 8 converging positions are selectively placed in the machining region 91, so as to machine the object 90 (FIG. 9(*b*)). When machining the remaining part of letter "H", 3 converging positions out of the 8 converging positions are selectively placed in the machining region 91, so as to machine the object 90, while the remaining 5 converging positions are placed on the shielding member 40 (FIG. 9(*c*)).

Thus, even when machining a single letter of "H" in 3 sessions, the number of laser beam converging positions in each session is fixed at 8, whereby fluctuations in machining in each session can be suppressed. The fourth mode can also appropriately set the number of converging positions formed by each hologram (i.e., the magnitude of laser beam irradiation energy at each converging position) according to the intensity of the laser beam outputted from the laser light source 10 independently of letters to be machined.

Hologram Producing Method

Figure 10:
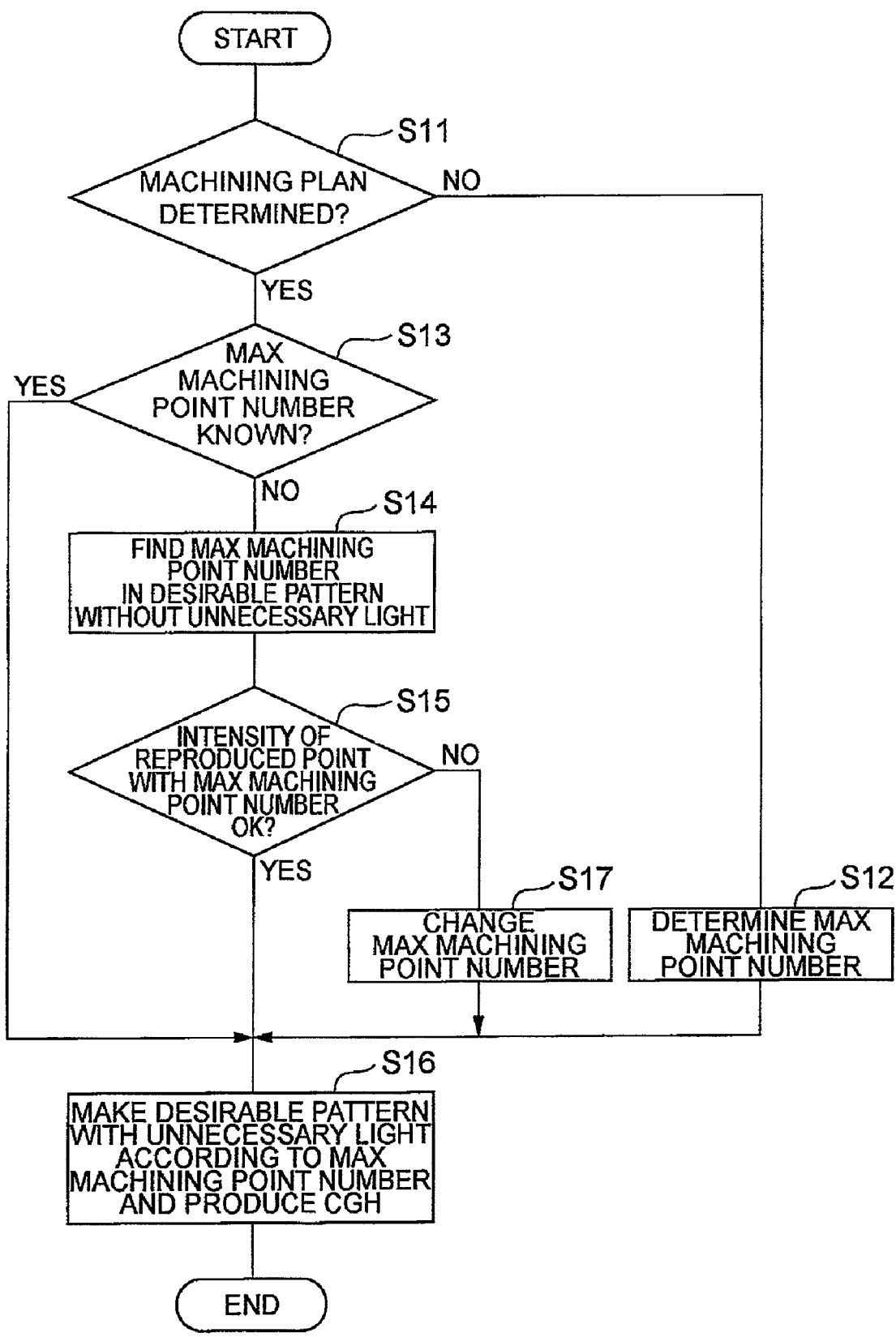
FIG. 10 is a flowchart of a hologram producing method in the first embodiment.

A hologram producing method in the laser machining device 1 in accordance with the first embodiment and the laser machining method in accordance with the first embodiment will now be explained. FIG. 10 is a flowchart of a hologram producing method in the first embodiment.

When no machining plan in each session has been determined yet ("No" in step S11), the maximum machining point number that is the largest number of laser beam converging positions in the machining region 91 in each machining session is determined (step S12), and then the flow shifts to step S16. When a machining plan in each session has already been determined ("Yes" in step S11) while the maximum machining point number has already been known ("Yes" in step S13), the flow shifts to step S16.

When a machining plan in each session has already been determined ("Yes" in step S11) while the maximum machining point number has not been known ("No" in step S13), it is determined that there is no unnecessary light converged on the shielding member 40, the maximum machining point number that is the largest number of laser beam converging positions in the machining region 91 in each machining session is found (step S14) and, if the laser beam intensity is unproblematic at each converging position in the case employing the maximum machining point number ("Yes" in step S15), the flow shifts to step S16. If the laser beam intensity has a problem in that it is too high or too low at each converging position in the case employing the maximum machining point number ("No" in step S15), the maximum machining point number is changed (step S17), and then the flow shifts to step S16.

In step S16, a desirable pattern is set according to the maximum machining point number (i.e., the total number of laser beam converging positions in each machining session), and a computer-generated hologram is produced by using the GS or ORA method. Converging positions reproduced by this hologram include those converged into the machining region 91 and, when necessary, those converged onto the shielding member 40.

Hologram Modifying Method

Figure 11:
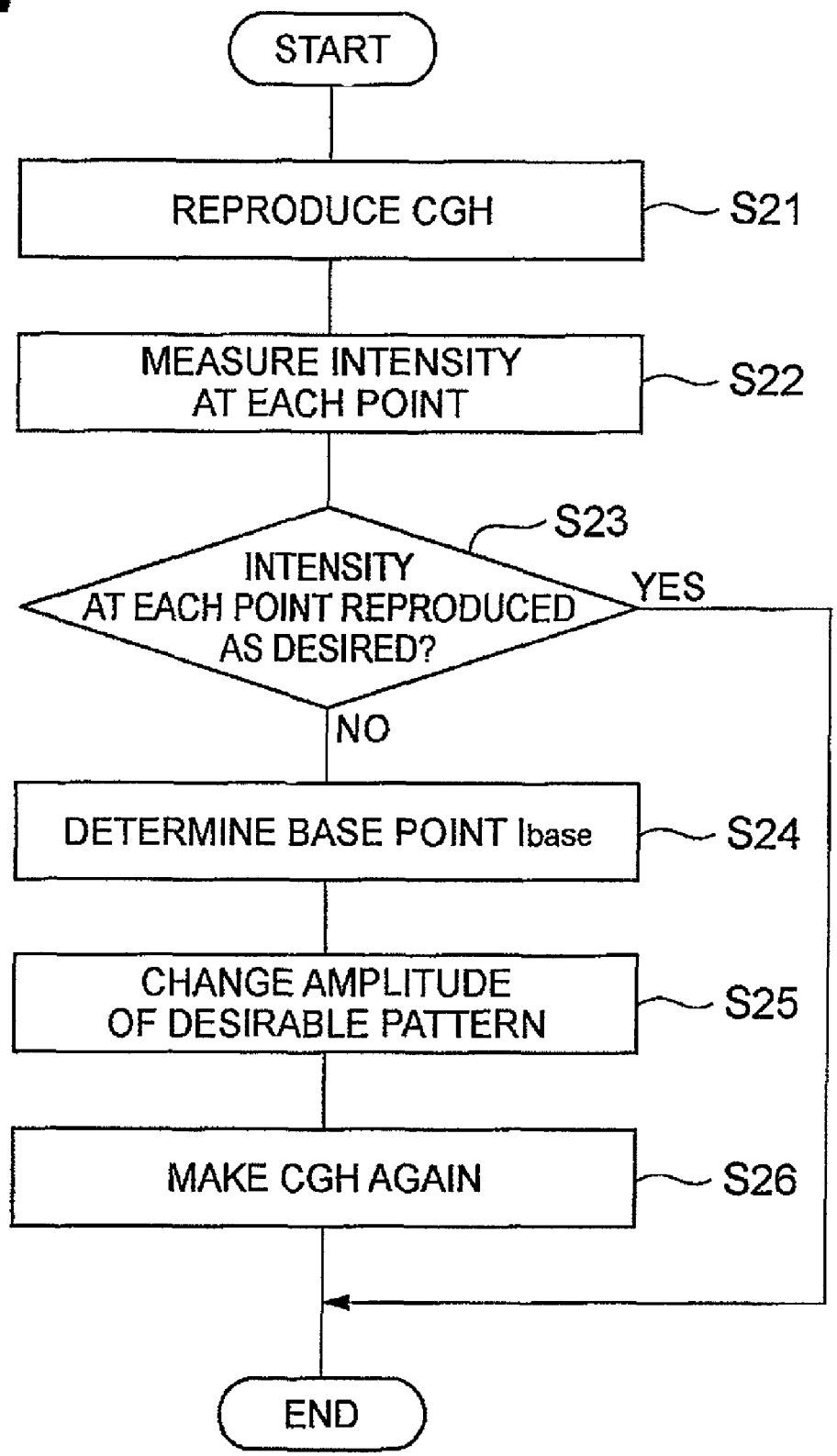
FIG. 11 is a flowchart of a hologram modifying method in the first embodiment.

When the spatial light modulator 20 is caused to display each of thus produced holograms, so that the phase-modulated laser beam outputted from the spatial light modulator 20 is converged at M converging positions through the converging optical system 30, the laser beam intensity may not be constant at each converging position in practice. In such a case, the hologram produced as mentioned above must be modified by performing feedback on the hologram produced as mentioned above. FIG. 11 is a flowchart of a hologram modifying method in the first embodiment.

For modifying a hologram, the spatial light modulator 20 is caused to display the hologram, and the phase-modulated laser beam outputted from the spatial light modulator 20 is converged by the converging optical system 30 at a plurality of converging positions (step S21), and the intensity of the laser beam at each converging position is measured by a CCD (Charged Coupled Device) (step S22). When the measured intensity of the laser beam at each converging position is as desired ("Yes" in step S23), the method is terminated. When the measured intensity of the laser beam at each converging position is not as desired ("No" in step S23), on the other hand, an intensity $I_{base}$ of a given base point in the measured converging positions is determined (step S24), the amplitude of the laser beam to be reproduced at each converging position in the desirable pattern is changed in conformity to this intensity (step S25), and a computer-generated hologram is produced again (step S26).

The intensity of the laser beam at each converging position measured in step S22 is defined as $I_n$. In step S25, the ratio ($=I_n/I_{base}$) of the intensity $I_n$ at each converging position to the intensity $I_{base}$ of the base point determined in step S24 is obtained, and the gradation $t_n$ of each point after the modification is determined by the equation $t_n = t_{base}(I_{base}/I_n)^{1/2}$, where $t_{base}$ is the gradation of the point employed as the base in the original pattern. Then, in step S26, a computer-generated hologram is produced again by the GS method according to the gradation $t_n$ of each point after the modification.

Feedback in the ORA method is described in Hidetomo Takahashi, Satoshi Hasegawa, and Yoshio Hayasaki, "Holographic femtosecond laser processing using optimal-rotation-angle method with compensation of spatial frequency response of liquid crystal spatial frequency response of liquid crystal spatial light modulator." Applied Optics, Vol. 46, Issue 23, pp. 5917-5923.

Such a modification of the hologram by feedback can also be employed when intentionally making the laser beam intensity uneven at the laser beam converging positions in the machining region 91 in machining sessions.

Figure 12:
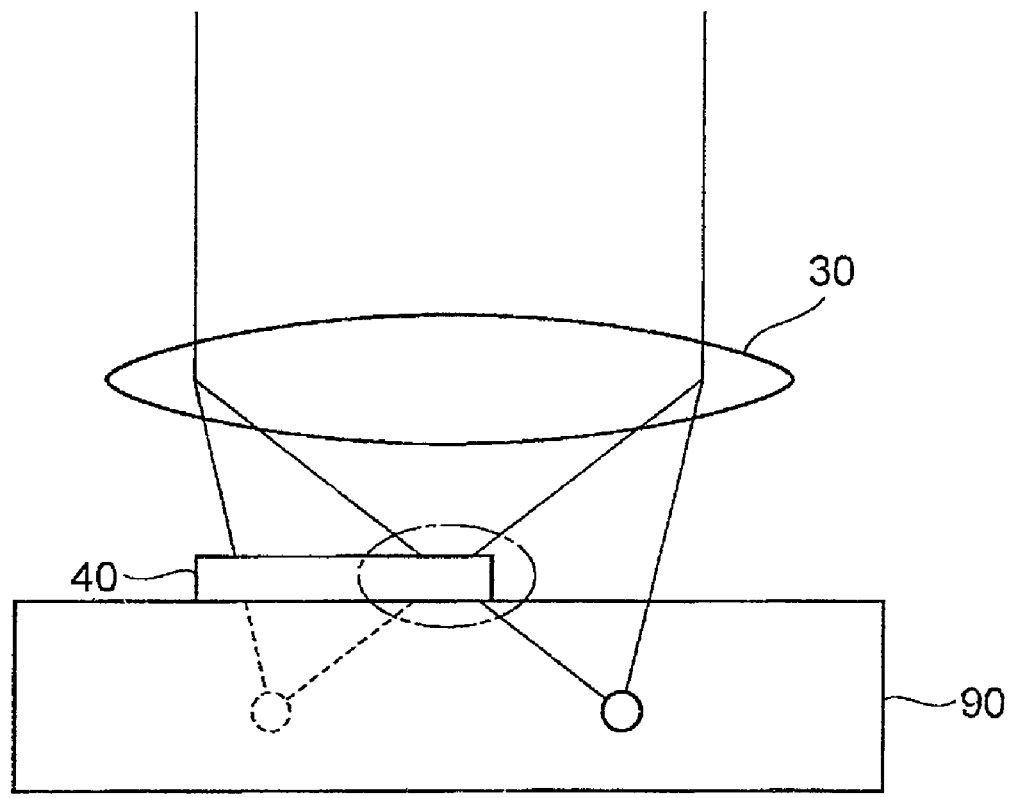
FIG. 12 is a diagram illustrating the relationship among a converging optical system 30, a shielding member 40, an object to be machined 90, and converging positions in the laser machining device 1 in accordance with the first embodiment and the laser machining method in accordance with the first embodiment.

When machining the inside of the object 90 in the laser machining device 1 in accordance with the first embodiment and the laser machining method in accordance with the first embodiment, a part of the laser beam converged by the converging optical system 30 toward a converging position may be blocked by the shielding member 40 as illustrated in FIG. 12. Such a state is likely to occur when an objective lens having a large NA is used as the converging optical system 30 or when the converging position is located deeper within the object 90. When such a state occurs, the intensity of the laser beam at the converging position decreases, and there is a danger of destroying the shielding member 40. For evading such a state, it is preferred to employ any of structures of the second to fourth embodiments which will be explained hereinafter.

Second Embodiment

Figure 13:
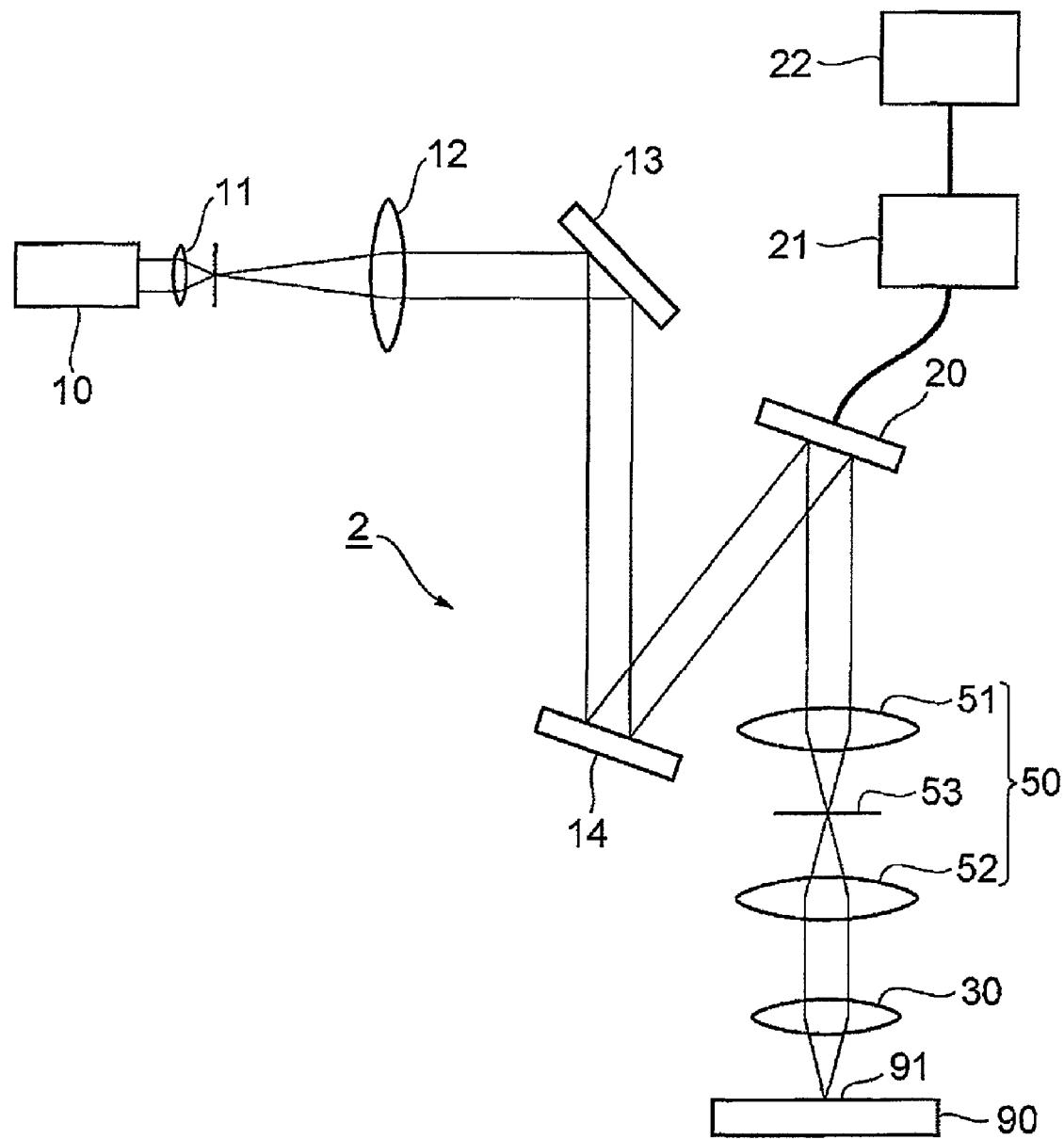
FIG. 13 is a diagram illustrating the structure of a laser machining device 2 in accordance with a second embodiment.

The second embodiment of the laser machining device and method in accordance with the present invention will now be explained. FIG. 13 is a diagram illustrating the structure of a laser machining device 2 in accordance with the second embodiment. The laser machining device 2 in accordance with the second embodiment illustrated in FIG. 13 differs from the structure of the laser machining device 1 in accordance with the first embodiment illustrated in FIG. 1 in that it comprises lenses 51, 52 and a shielding member 53 instead of the shielding member 40.

The lenses 51, 52 are disposed between the spatial light modulator 20 and converging optical system 30 and constitute a 4f optical system 53. The shielding member 53 is disposed between the first and second lenses 51, 52. The shielding member 53 blocks the laser beam such that (M−N) converging positions out of M converging positions formed by the converging optical system 30 excluding N converging positions to be placed in the machining region 91 are kept from being placed in the machining region 91.

This structure can lower the possibility of blocking a part of the laser beam reaching the N converging positions to be placed in the machining region 91, since the shielding member 53 within the 4f optical system can block unnecessary light (light excluding the laser beam to reach the machining region 91). Making the NA of the lenses 51, 52 in the 4f optical system 50 greater than that of the converging optical system 30 can increase the converging spot diameter in the shielding member 53. This can lower the power density in the shielding member 53, thereby preventing the shielding member 53 from being destroyed.

The laser beam outputted from the spatial light modulator 20 displaying each of a plurality of holograms is converged by the converging optical system 30 at M converging positions having a fixed number, N converging positions out of the M converging positions are selectively placed in the machining region 91, and the object 90 is machined in this embodiment as well. The shielding member 53 keeps the remaining (M−N) converging positions from being placed on the object 90. Since the number of laser beam converging positions is fixed at M in each session, the laser beam irradiation energy at each converging position is substantially constant among sessions, whereby fluctuations in machining can be suppressed among sessions.

Third Embodiment

Figure 14:
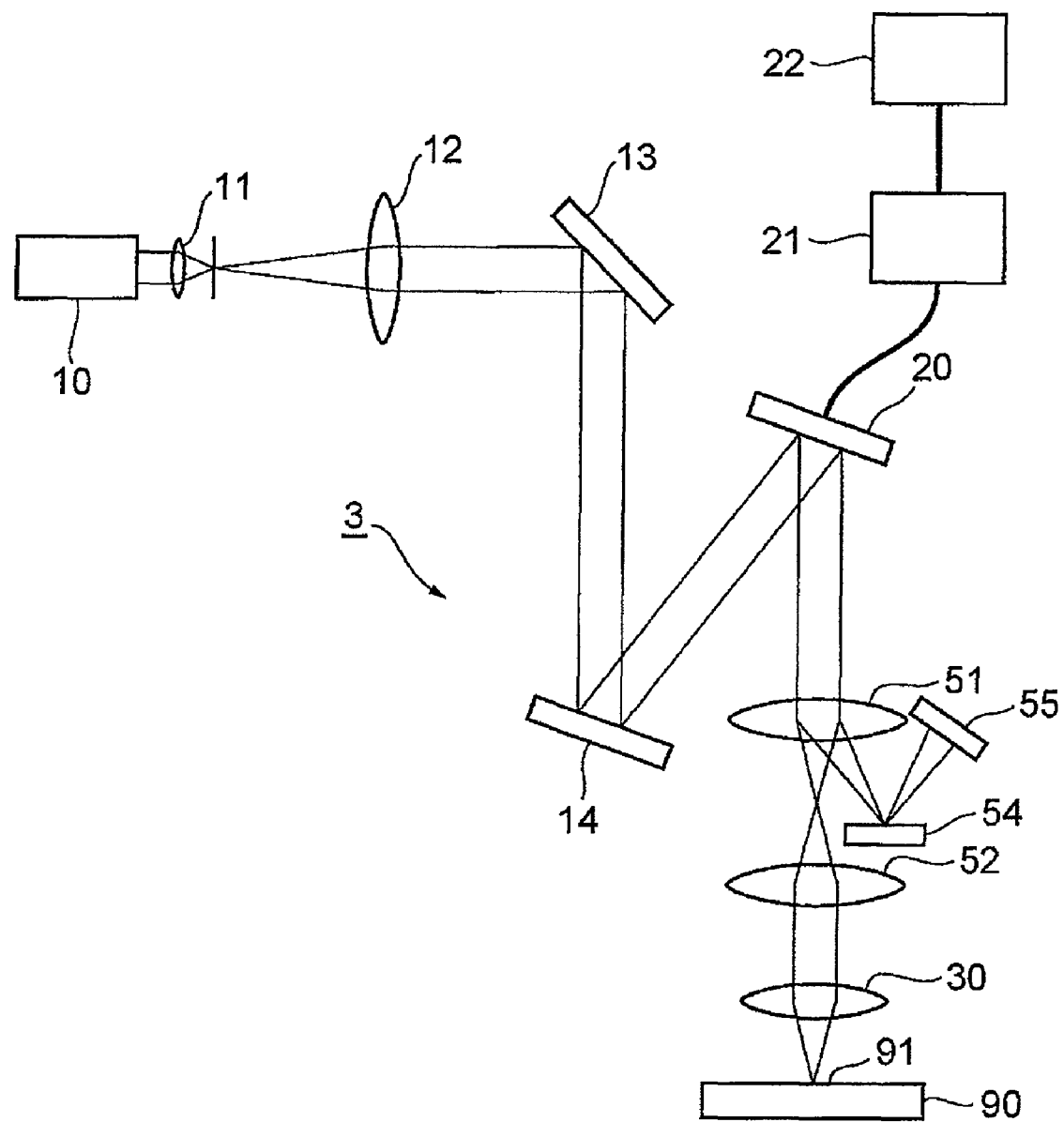
FIG. 14 is a diagram illustrating the structure of a laser machining device 3 in accordance with a third embodiment.

The third embodiment of the laser machining device and method in accordance with the present invention will now be explained. FIG. 14 is a diagram illustrating the structure of a laser machining device 3 in accordance with the third embodiment. The laser machining device 3 in accordance with the third embodiment illustrated in FIG. 14 differs from the structure of the laser machining device 2 in accordance with the second embodiment illustrated in FIG. 13 in that it comprises a mirror 54 and a damper 55 instead of the shielding member 53.

The mirror 54 is disposed between the first and second lenses 51, 52 constituting the 4f optical system 50. The mirror 54 reflects the laser beam such that (M−N) converging positions out of M converging positions formed by the converging optical system 30 excluding N converging positions to be placed in the machining region 91 are kept from being placed in the machining region 91. The damper 55 is adapted to input and absorb the laser beam reflected by the mirror 54.

This structure can lower the power density of the unnecessary light reaching the damper 55 after being reflected by the mirror 54 (the light excluding the laser beam to reach the machining region 91), thereby preventing the unnecessary light from machining the shielding member and filters.

The laser beam outputted from the spatial light modulator 20 displaying each of a plurality of holograms is converged by the converging optical system 30 at M converging positions having a fixed number, N converging positions out of the M converging positions are selectively placed in the machining region 91, and the object 90 is machined in this embodiment as well. The mirror 54 keeps the remaining (M−N) converging positions from being placed on the object 90. Since the number of laser beam converging positions is fixed at M in each session, the laser beam irradiation energy at each converging position is substantially constant among sessions, whereby fluctuations in machining can be suppressed among sessions.

Fourth Embodiment

The fourth embodiment of the laser machining device and method in accordance with the present invention will now be explained.

Figure 15:
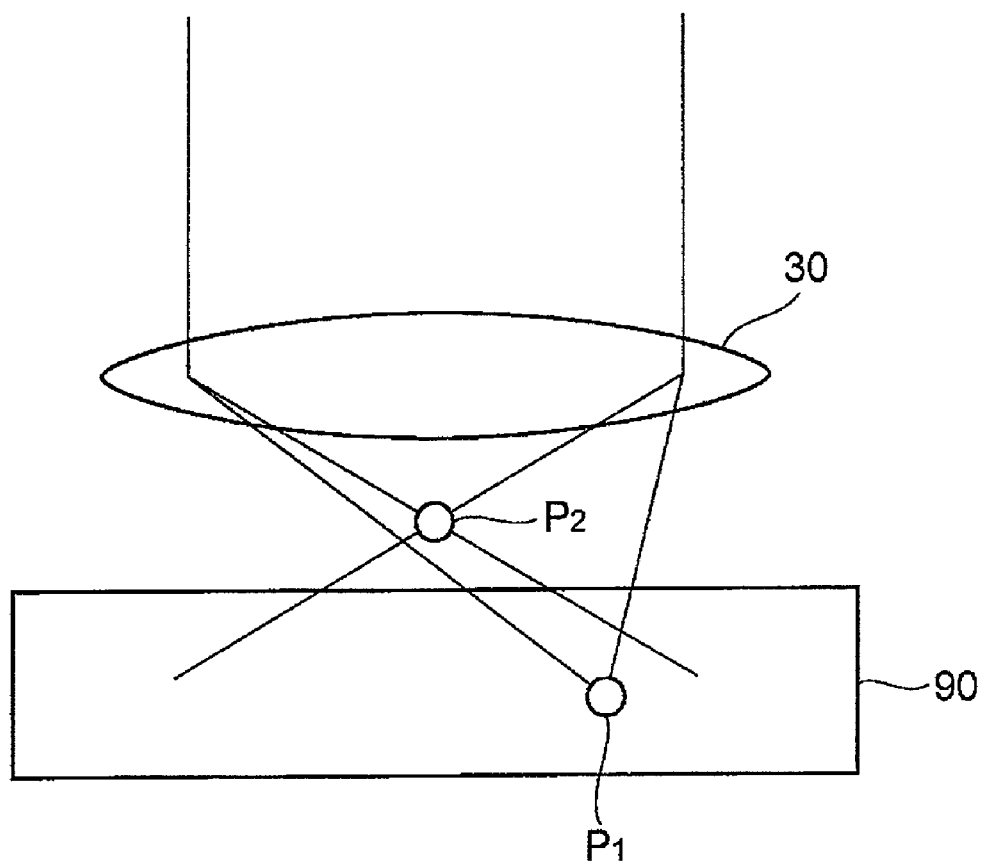
FIG. 15 is a diagram illustrating a part of the structure of a laser machining device in accordance with a fourth embodiment.

FIG. 15 is a diagram illustrating a part of the structure of the laser machining device in accordance with the fourth embodiment. The overall structure of the laser machining device in accordance with the fourth embodiment is substantially the same as that illustrated in FIG. 1.

In the fourth embodiment, through the driver 21, the controller 22 causes the spatial light modulator 20 to display a hologram such that N converging positions out of M converging positions formed by the converging optical system 30 are placed in the machining region 91, while the remaining (M−N) converging positions are placed in a region on the outside of the machining region 91. The region on the outside of the machining region 91 is a space on the outside of the object 90.

FIG. 15 illustrates the case where the outside region mentioned above is a space above the machining region 91. As illustrated in FIG. 15, the laser beam is converged at a converging position $P_1$ in the machining region 91 in the object 90 and machines the converging position $P_1$. While the laser beam is also converged at a converging position $P_2$ in a space above the object 90, it does not contribute to machining the object 90. In FIG. 15, the intensity of the laser beam (unnecessary light) at the converging position $P_2$ may be either higher or lower than a machining threshold for the object 90 but is required to be such as to keep the object 90 and other instruments within or on the outside of the machining device from being affected thereby.

Figure 26:
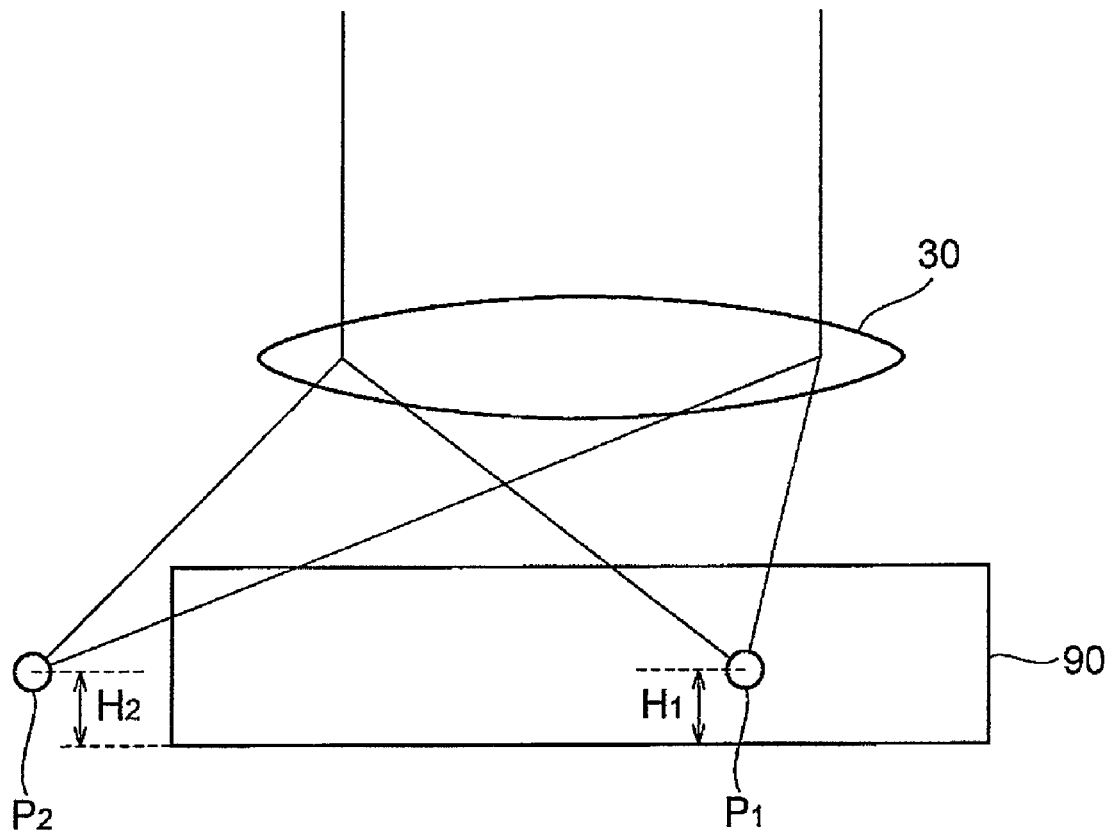
FIG. 26 is a diagram illustrating a part of the structure of the laser machining device in accordance with the fourth embodiment.
Figure 27:
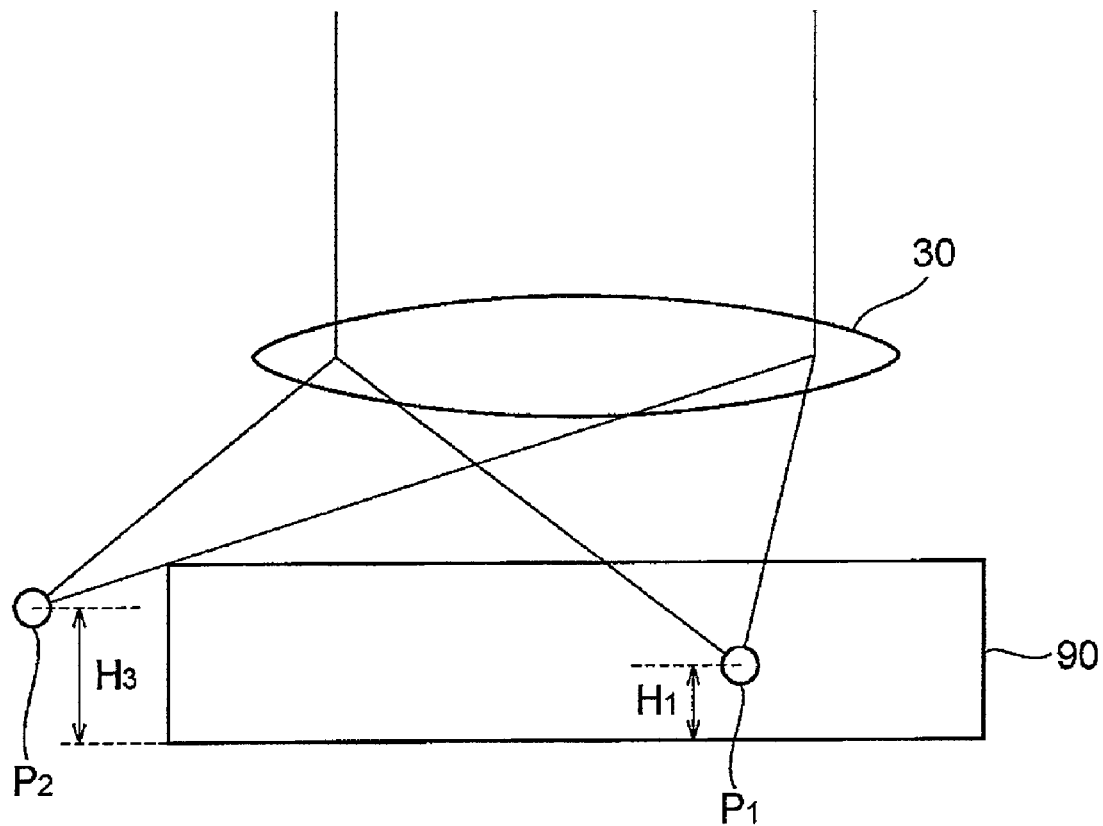
FIG. 27 is a diagram illustrating a part of the structure of the laser machining device in accordance with the fourth embodiment.

FIGS. 26 and 27 illustrate cases where the outside region is a space flanking the machining region. As illustrated in FIGS. 26 and 27, the laser beam is converged at the first converging position $P_1$ in the machining region 91 in the object 90 and machines this converging position $P_1$. While the laser beam is also converged at the second converging position $P_2$ in a space flanking the object 90, it does not contribute to machining the object 90. The converging positions $P_1$, $P_2$ may exist on the same plane (i.e., $H_1$ equals $H_2$) as illustrated in FIG. 26 or different planes (i.e., $H_1$ and $H_3$ differ from each other) as illustrated in FIG. 27. Here, $H_1$, $H_2$, $H_3$, and the like indicate heights from the bottom face of the object 90.

In FIGS. 26 and 27, the intensity of the laser beam (unnecessary light) at the converging position $P_2$ may be either higher or lower than a machining threshold for the object 90 but is required to be such as to keep the object 90 and other instruments within or on the outside of the machining device from being affected thereby. The controller 22 arranges unnecessary light as such by causing the spatial light modulator 20 to display a hologram as a matter of course.

The laser beam outputted from the spatial light modulator 20 displaying each of a plurality of holograms is converged by the converging optical system 30 at M converging positions having a fixed number, N converging positions out of the M converging positions are selectively placed in the machining region 91, and the object 90 is machined in this embodiment as well. The remaining (M−N) converging positions are kept from being placed on the object 90. Since the number of laser beam converging positions is fixed at M in each session, the laser beam irradiation energy at each converging position is substantially constant among sessions, whereby fluctuations in machining can be suppressed among sessions.

Another Mode of the Fourth Embodiment

Though the arrangement of unnecessary light in the outside region (a part above or flanking the object 90) unrelated to the machining of the object 90 is explained in the foregoing, an uninfluential region (hereinafter referred to as "uninfluential region A") disposed within the object 90 and kept from influencing the machining of the object 90 even when irradiated with the converged laser beam can be used as a location where the unnecessary light is placed.

Figure 28:
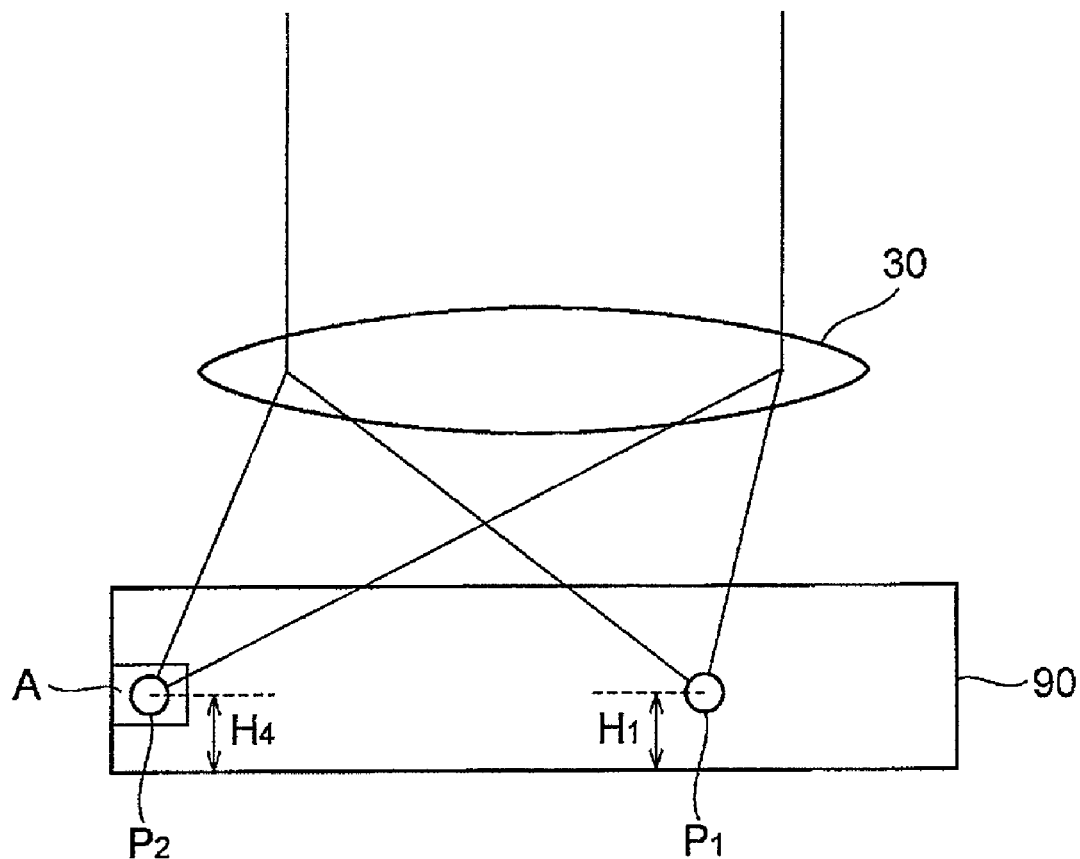
FIG. 28 is a diagram illustrating a part of the structure of the laser machining device in accordance with another mode of the fourth embodiment.
Figure 29:
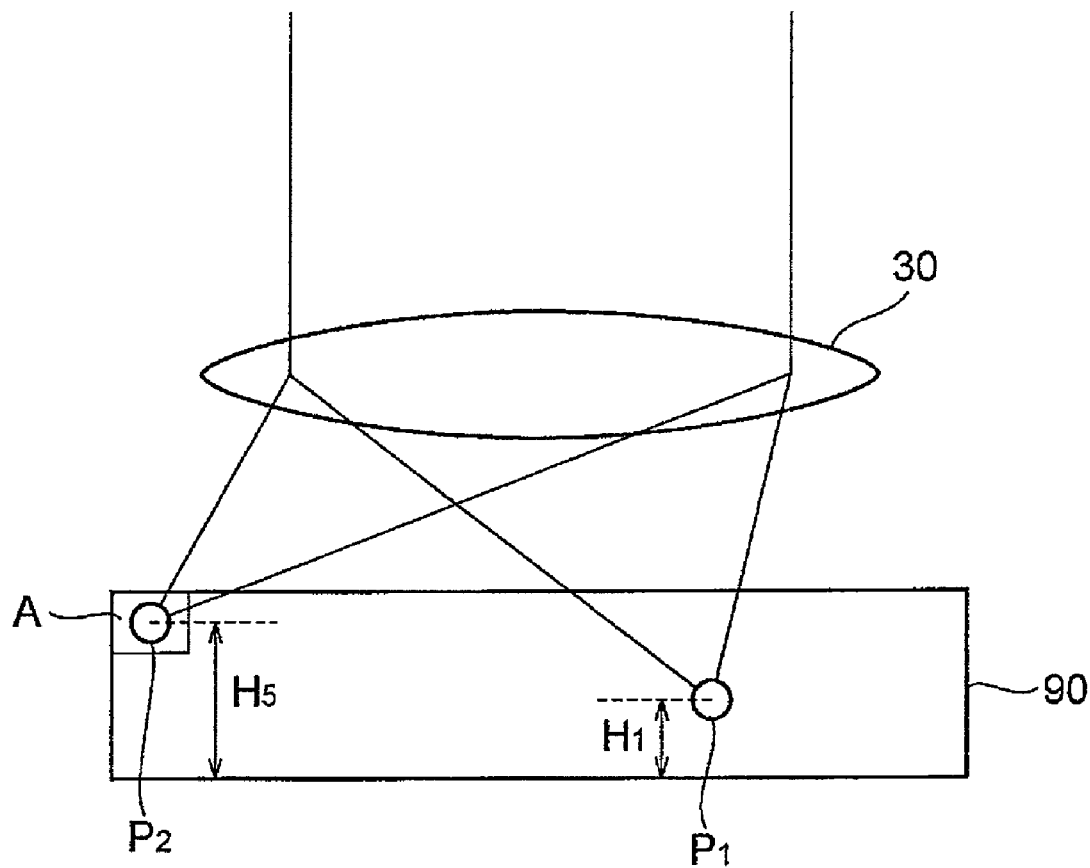
FIG. 29 is a diagram illustrating a part of the structure of the laser machining device in accordance with still another mode of the fourth embodiment.

FIGS. 28 and 29 illustrate states where the uninfluential region A is disposed within the object 90. As illustrated in FIGS. 28 and 29, the laser beam is converged at the converging position $P_1$ in the machining region 91 in the object 90 and machines this converging position $P_1$. While the laser beam is also converged at the converging position $P_2$ in the uninfluential region A disposed within the object 90 and machines this converging position $P_2$, this does not contribute to machining the object 90 as a whole. The converging positions $P_1$, $P_2$ may exist on the same plane (i.e., $H_1$ equals $H_4$) as illustrated in FIG. 28 or multidimensional planes (i.e., $H_1$ and $H_5$ differ from each other) as illustrated in FIG. 29. Here, $H_1$, $H_4$, $H_5$, and the like indicate heights from the bottom face of the object 90. In other words, the uninfluential region A may be disposed on the same plane as the converging position $P_1$ to be machined or on a plane different therefrom. After the machining is completed, the uninfluential region A may be cut off and discarded as appropriate.

In FIGS. 28 and 29, the intensity of the laser beam (unnecessary light) at the converging position $P_2$ may be either higher or lower than a machining threshold for the object 90 but is required to be such as to keep the part of the object 90 excluding the uninfluential region. A from being affected thereby. The controller 22 arranges unnecessary light as such by causing the spatial light modulator 20 to display a hologram as a matter of course.

Fifth Embodiment

Figure 16:
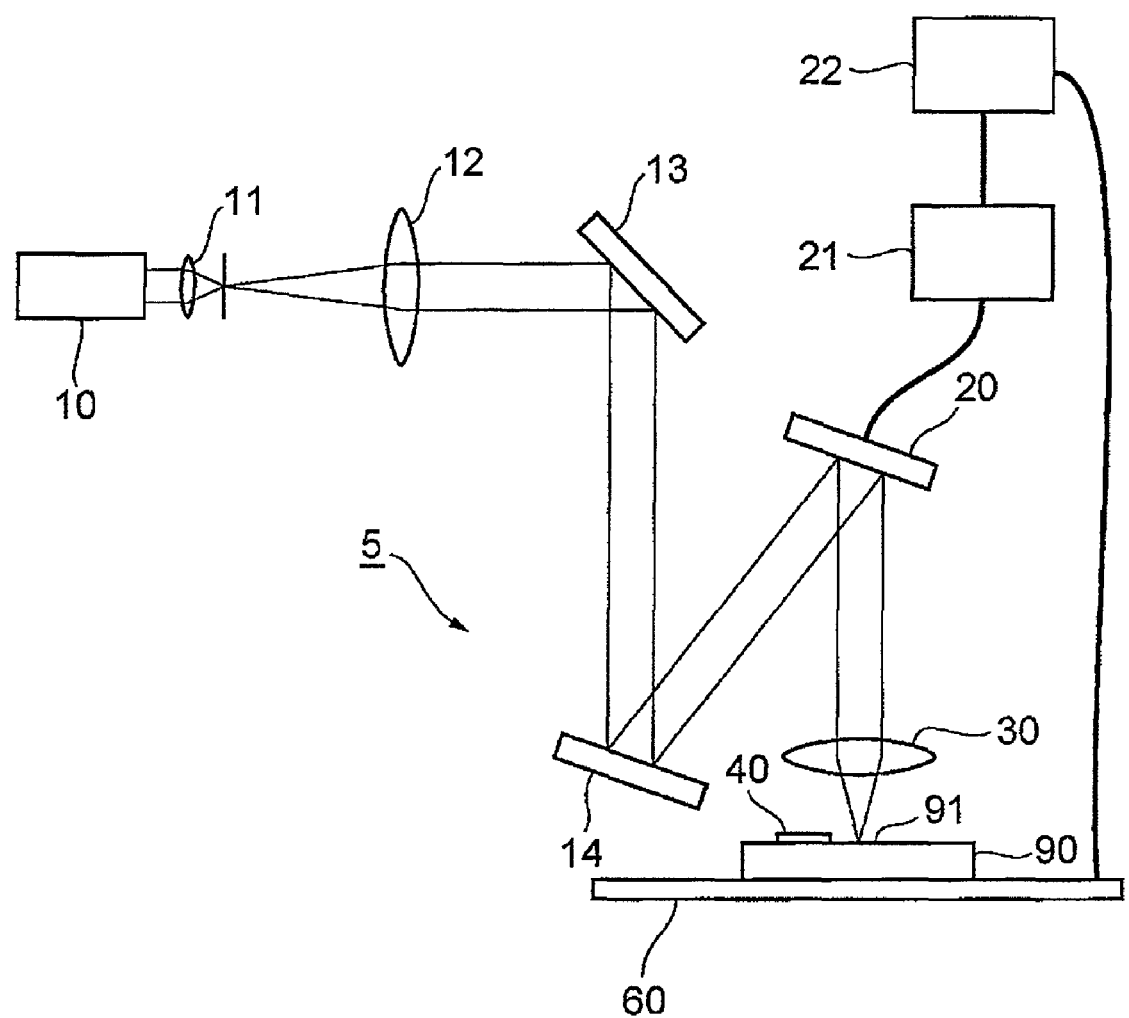
FIG. 16 is a diagram illustrating the structure of a laser machining device 5 in accordance with a fifth embodiment.

The fifth embodiment of the laser machining device and method in accordance with the present invention will now be explained. FIG. 16 is a diagram illustrating the structure of a laser machining device 5 in accordance with the fifth embodiment. The laser machining device 5 in accordance with the fifth embodiment illustrated in FIG. 16 differs from the structure of the laser machining device 1 in accordance with the first embodiment illustrated in FIG. 1 in that it further comprises a mover 60.

The mover 60 relatively moves the object 90. Preferably, the moving direction is perpendicular to the optical axis of the converging optical system 30. Through the driver 21, the controller 22 causes the spatial light modulator 20 to display a plurality of holograms sequentially and makes the mover 60 move the object 90 relatively.

Figure 17:
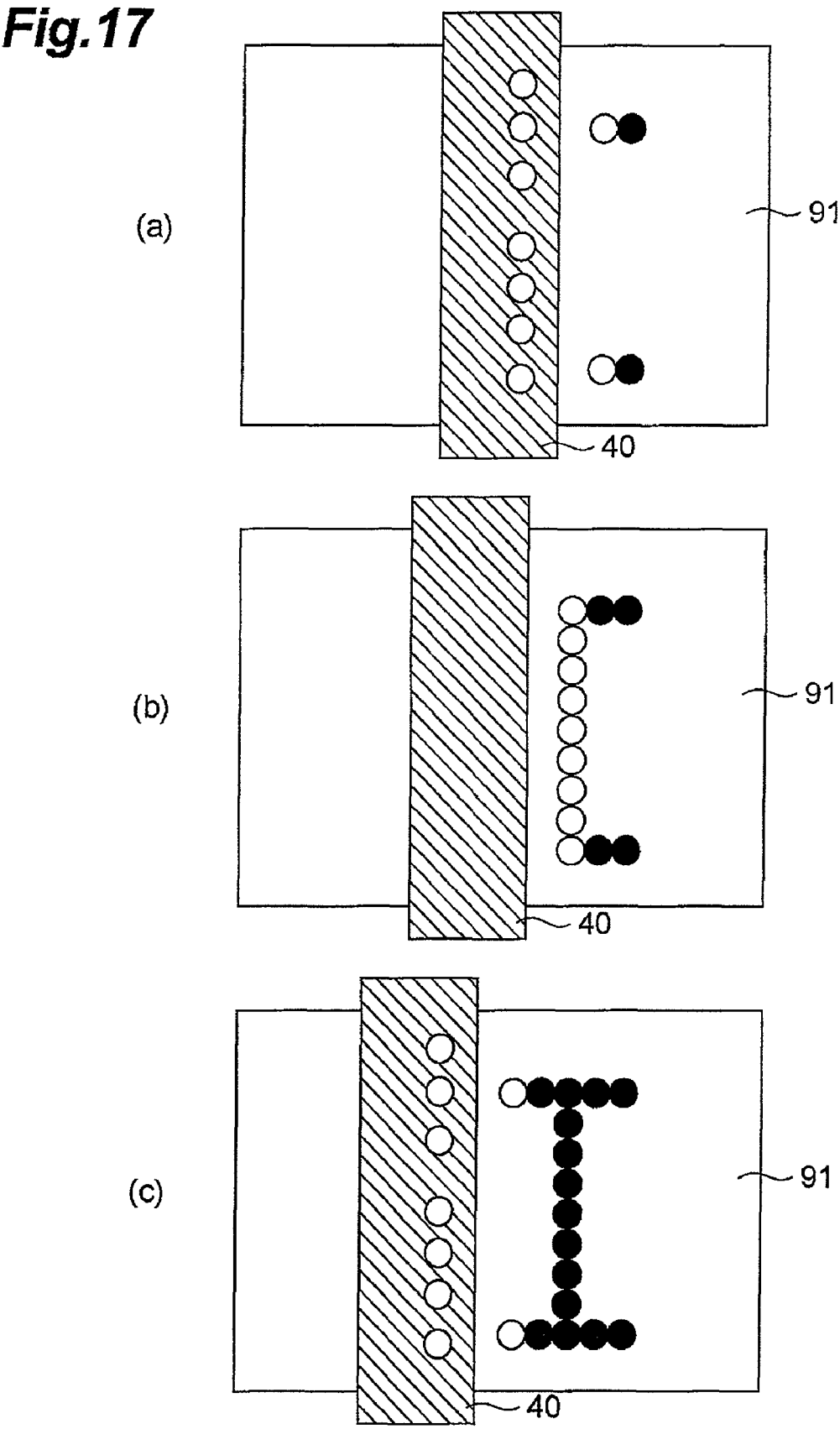
FIG. 17 is a diagram explaining a laser machining method in accordance with the fifth embodiment.

The operation of the laser machining device 5 in accordance with the fifth embodiment and the laser machining method in accordance with the fifth embodiment will now be explained. FIG. 17 is a diagram explaining the laser machining device in accordance with the fifth embodiment. In each of (a) to (c) in this diagram, white circles indicate respective laser beam converging positions, while black circles represent already machined positions. The object 90 is assumed to move rightward as the machining progresses from (a) to (c) in the diagram.

In this example, the laser beam outputted from the spatial light modulator 20 sequentially displaying 3 holograms is converged by the converging optical system 30 at 9 converging positions having a fixed number. In FIG. 17(a), 2 converging positions out of the 9 converging positions are selectively placed in the machining region 91, so as to machine the object 90, while the remaining 7 converging positions are placed on the shielding member 40. In FIG. 17(b) illustrating the object 90 shifted rightward from that in FIG. 17(a) by a predetermined distance, all of the 9 converging positions are selectively placed in the machining region 91, so as to machine the object 90. In FIG. 17(*c*) illustrating the object 90 further shifted rightward from that in FIG. 17(*b*) by a predetermined distance, 2 converging positions out of the 9 converging positions are selectively placed in the machining region 91, so as to machine the object 90, while the remaining 7 converging positions are placed on the shielding member 40.

The laser beam outputted from the spatial light modulator 20 displaying each of a plurality of holograms is converged by the converging optical system 30 at M converging positions having a fixed number, N converging positions out of the M converging positions are selectively placed in the machining region 91, and the object 90 is machined in this embodiment as well. The remaining (M−N) converging positions are kept from being placed on the object 90. Since the number of laser beam converging positions is fixed at M in each session, the laser beam irradiation energy at each converging position is substantially constant among sessions, whereby fluctuations in machining can be suppressed among sessions.

While the mover 60 moves the object 90, the spatial light modulator 20 can display a hologram corresponding to the amount of movement in this embodiment. Though the diffraction angle of the laser beam in the spatial light modulator 20 is limited because of the fact that the pixel pitch of the spatial light modulator 20 is fixed, this embodiment can machine the wide machining region 91 by moving the object 90.

This embodiment may move the object 90 with respect to the laser machining device 5 or the laser machining device 5 with respect to the object 9. The mirrors 13, 14, spatial light modulator 20, converging optical system 30, and shielding member 40 in the laser machining device 5 may be moved perpendicular to the optical axis of the converging optical system 30.

Sixth Embodiment

The sixth embodiment of the laser machining device and method in accordance with the present invention will now be explained. The sixth embodiment differs from the first to fifth embodiments in that the unit of converging light and machining is a pattern having a fixed area instead of a dot. The term "pattern having a fixed area" is meant to encompass lines as well. The sixth embodiment is basically the same as the above-mentioned first to fifth embodiments except that the unit of converging light and machining is a pattern having a fixed area instead of a dot, and thus will be explained in brief in the following mainly in terms of its differences from the first to fifth embodiments.

Structure of the Laser Machining Device 1

The overall structure of the laser machining device 1 in accordance with the sixth embodiment is substantially the same as that illustrated in FIG. 1. However, they differ from each other in terms of the function of the controller 22. The controller 22 in accordance with the sixth embodiment causes the spatial light modulator 20 to display a plurality of holograms sequentially. Then, the controller 22 causes the converging optical system 30 to converge the laser beam outputted from the spatial light modulator 20 displaying each of the plurality of holograms into a converging region having an area X, which is a pattern having a predetermined area, selectively places a converging region having an area Y out of the converging region having the area X in the machining region 91, and machines the object 90. Here, X is a positive number, and Y is a positive number not greater than X. The machining region 91 where the above-mentioned converging region having an area Y is placed includes not only the front face of the object 90 but also the inside thereof.

Laser Machining Method, Corresponding to the First Mode of the First Embodiment

Figure 30:
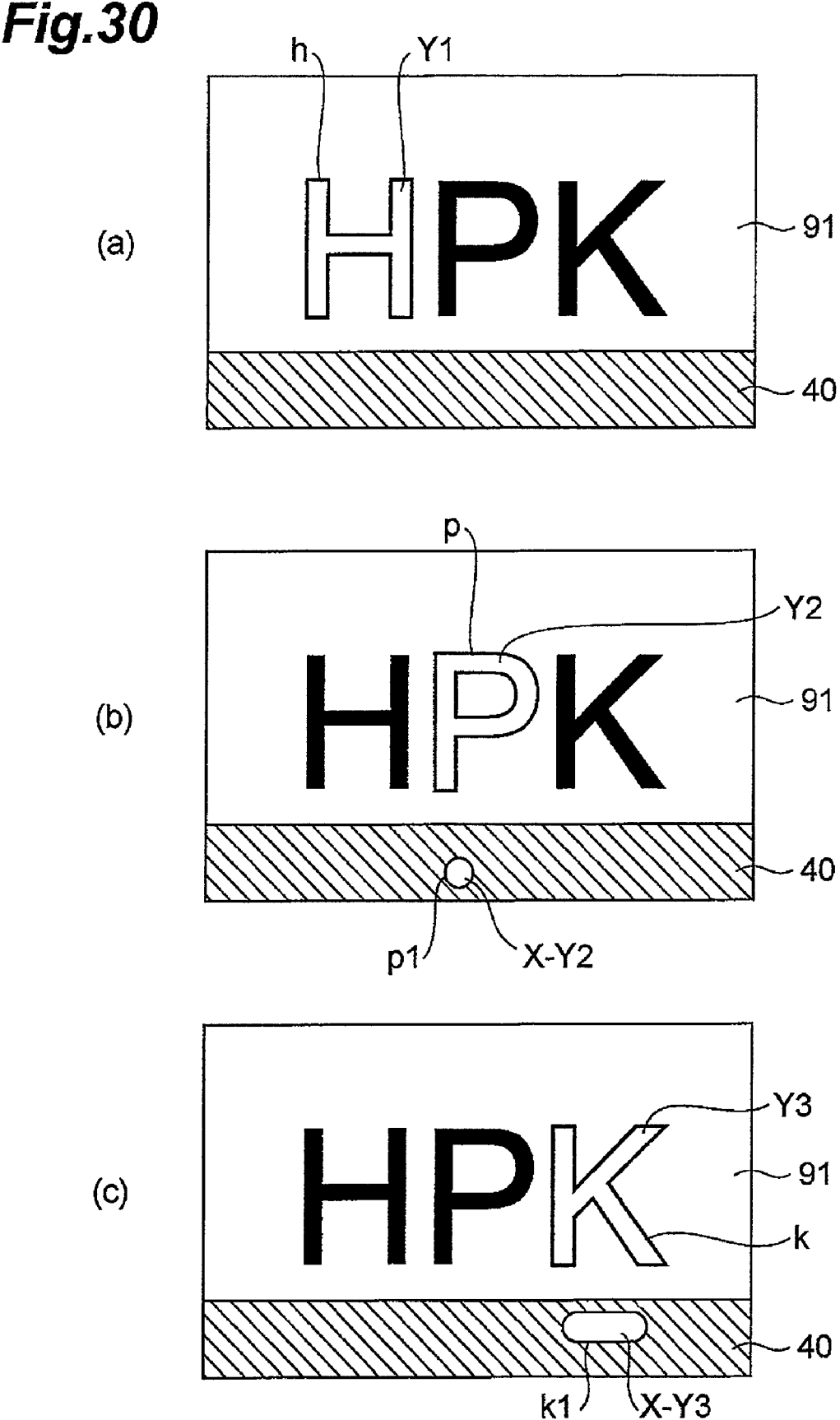
FIG. 30 is a diagram explaining a laser machining method in accordance with a sixth embodiment.

The above-mentioned description in the first mode of the laser machining device in accordance with the first embodiment also applies to the sixth embodiment. FIG. 30 is a diagram for explaining this matter. FIG. 30(*a*) illustrates how the laser beam irradiates a converging region (pattern h) having an area Y1 within the machining region 91 in order to machine letter "H". FIG. 30(*b*) illustrates how the laser beam irradiates a converging region (pattern p) having an area Y2 within the machining region 91 in order to machine letter "P" and a converging region (pattern p1) having an area (X−Y2) on the shielding member 40. FIG. 30(*c*) illustrates how the laser beam irradiates a converging region (pattern k) having an area Y3 within the machining region 91 in order to machine letter "K" and a converging region (pattern k1) having an area (X−Y3) on the shielding member 40. Y1, Y2, and Y3 are examples of areas (area Y in the claims) of parts selectively placed in the machining region 91 and have the relationship of Y1>Y2>Y3 in terms of magnitude. The relationship of Y1, Y2, and Y3 can more easily be understood in connection with the above-mentioned first embodiment if the areas Y1, Y2, and Y3 are assumed to be those of 12, 11, and 10 dots, respectively, for example.

That is, the laser beam outputted from the spatial light modulator 20 sequentially displaying respective holograms corresponding to "H", "P", and "K" are converged by the converging optical system 30 into the converging region having a fixed area of X. When machining letter "H", the whole converging region having an area X is selectively placed in the machining region 91, so as to machine the object 90 (i.e., X=Y1; FIG. 30(*a*)). When machining letter "P", a converging region having an area Y2 out of the converging region having the area X is selectively placed in the machining region 91, so as to machine the object 90, while a converging region having the remaining area (X−Y2) is selectively placed on the shielding member 40 (FIG. 30(*b*)). When machining letter "K", a converging region having an area Y3 out of the converging region having the area X is selectively placed in the machining region 91, so as to machine the object 90, while a converging region having the remaining area (X−Y3) is selectively placed on the shielding member 40 (FIG. 30(*c*)).

In FIG. 30, the maximum area Z of the converging region for machining the part of letter "H" (the part that requires the largest converging region area for machining among letters "H", "P", and "K" and corresponds to the "predetermined part" in the claims) in the object 90 equals Y1, which is identical to the total area X of the converging region of the laser beam. Here, Z is an integer.

Even when machining letters "H", "P", and "K" one by one in this order, the total area of the laser beam converging region is fixed at X regardless of the letters, so that the laser beam irradiation energy at each converging position is substantially constant among the letters, whereby fluctuations in machining can be suppressed independently of the letters.

Corresponding to the Other Items of the First to Fifth Embodiments

The foregoing explains that matters similar to those in the first mode of the laser machining method in accordance with the first embodiment can be said in the sixth embodiment while taking account of the fact that the unit of converging light and machining is a pattern having a fixed area instead of a dot. In view of the foregoing explanation, one skilled in the art will easily understand that matters similar to the other items of the first embodiment, i.e., the first to fourth modes of the laser machining method in accordance with the first embodiment, the hologram producing method, and the hologram modifying method, can be said in the sixth embodiment while taking account of the fact that the unit of converging light and machining is a pattern having a fixed area instead of a dot. Also, in view of the foregoing explanation, matters similar to the second to fourth embodiments, the other modes of the fourth embodiment, and the fifth embodiment can be said in the sixth embodiment while taking account of the fact that the unit of converging light and machining is a pattern having a fixed area instead of a dot.

For easier understanding, it is preferred to replace "M" with "X", "N" with "Y", "L" with "Z", "M converging regions having a fixed number" with "a converging region having a fixed area X", "N converging positions out of the M converging positions" with "a converging region having an area Y out of the converging region having an area X", "maximum number L of converging positions" with "maximum area Z of the converging region", and "(M−N) converging positions out of the M converging positions excluding the N converging positions to be placed in the machining region 91" with "a converging region having an area (X−Y) out of the converging region having an area X excluding the converging region having an area Y to be placed in the machining region 91" in the explanations of the first to fifth embodiments.

MODIFIED EXAMPLES

Without being restricted to the above-mentioned embodiments, the present invention can be modified in various ways. For example, each of the second to fifth embodiments may employ the first to third modes of writing holograms into the spatial light modulator 20 explained with reference to FIGS. 2 to 4 in the first embodiment and the first to forth modes of placing converging positions at the time of machining in each session explained with reference to FIGS. 6 to 9, 24, and 25 in the first embodiment.

As with the fifth embodiment, each of the second to fourth embodiments may make the mover relatively move the object 90, while causing the spatial light modulator 20 to display a plurality of holograms sequentially.

Two or more of the structure comprising the shielding member 40 in the first embodiment, the structure comprising the 4f optical system 50 and shielding member 53 in the second embodiment, the structure comprising the 4f optical system 50 and mirror 54 in the third embodiment, and the structure of placing the unnecessary (M−N) converging positions into a region on the outside of the machining region 91 in the fourth embodiment may be used in combination.

All these modifications are applicable to the sixth embodiment as a matter of course. That is, the unit of converging light and machining may be a pattern having a fixed area instead of a dot in the foregoing modified examples.

Example 1

Figure 18:
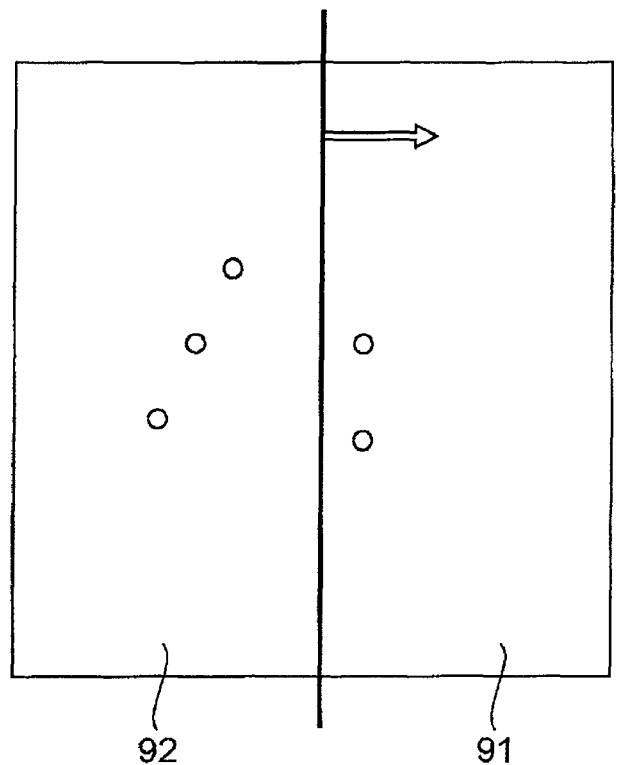
FIG. 18 is a diagram illustrating respective arrangements of laser beam converging positions in a machining region 91 and a shielded region 92 in Example 1.
Figure 18:
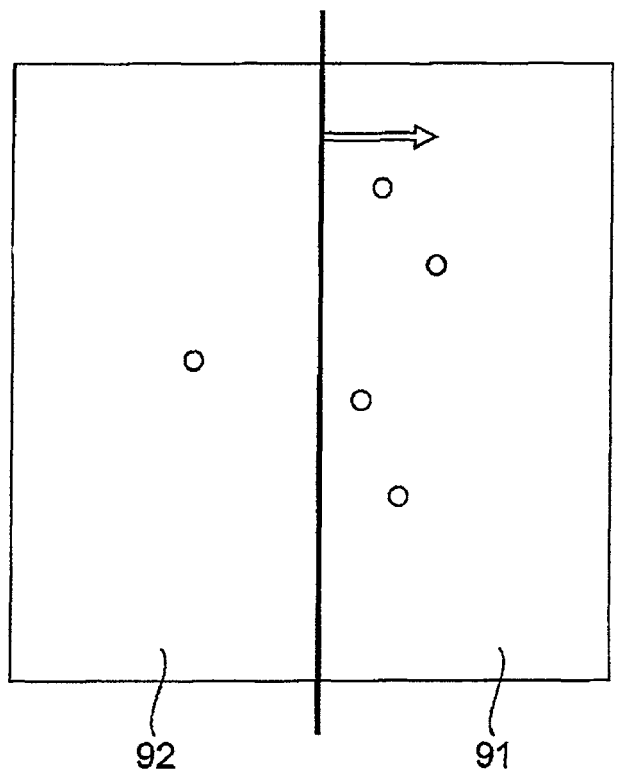

A case initially machining at 2 converging positions and then at 4 converging positions will be assumed here. A comparative example initially sets the total number of converging positions to 2 and then to 4. By contrast, as illustrated in FIG. 18, Example 1 initially places 2 converging positions in the machining region 91 and 3 converging positions in a shielding region 92, and then 4 converging positions in the machining region 91 and 1 converging position in the shielding region 92.

FIG. 19 is a chart listing laser beam intensities at respective converging positions in the comparative example. It can be seen that the laser beam intensity for machining varies between the case of machining at 2 points and the case of machining at 4 points (e.g., 2200 nW and 1100 nW at point 1). Since the light intensity varies, uniform machining is difficult. FIG. 20 is a chart listing laser beam intensities at respective converging positions in Example 1. The laser beam intensity at each converging position is found to be substantially constant (within the range of 905 nW to 920 nW) in Example 1, since the total number of converging positions is fixed at 5 even when the number of converging positions varies in the machining region 91.

Example 2

Figure 31:
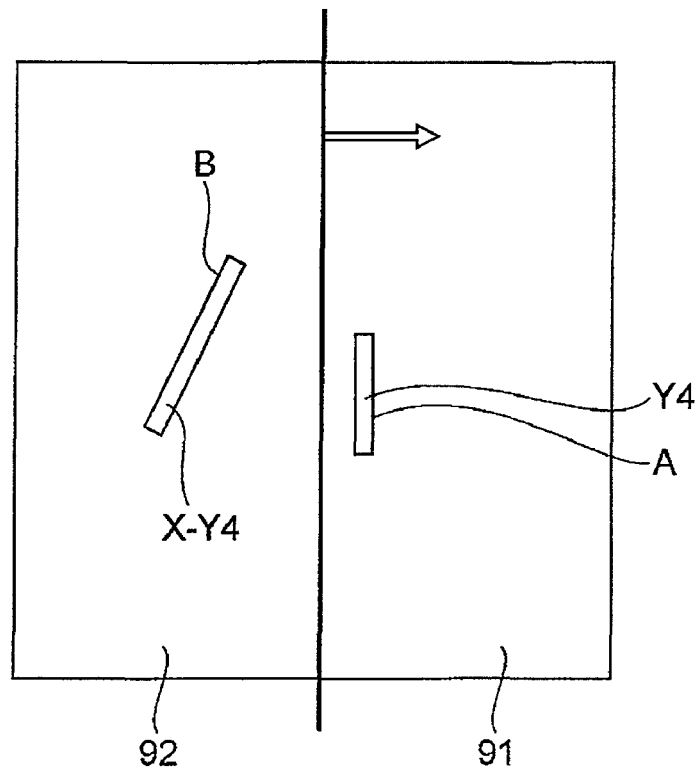
FIG. 31 is a diagram illustrating respective arrangements of laser beam converging positions in the machining region 91 and shielded region 92 in Example 2.
Figure 31:
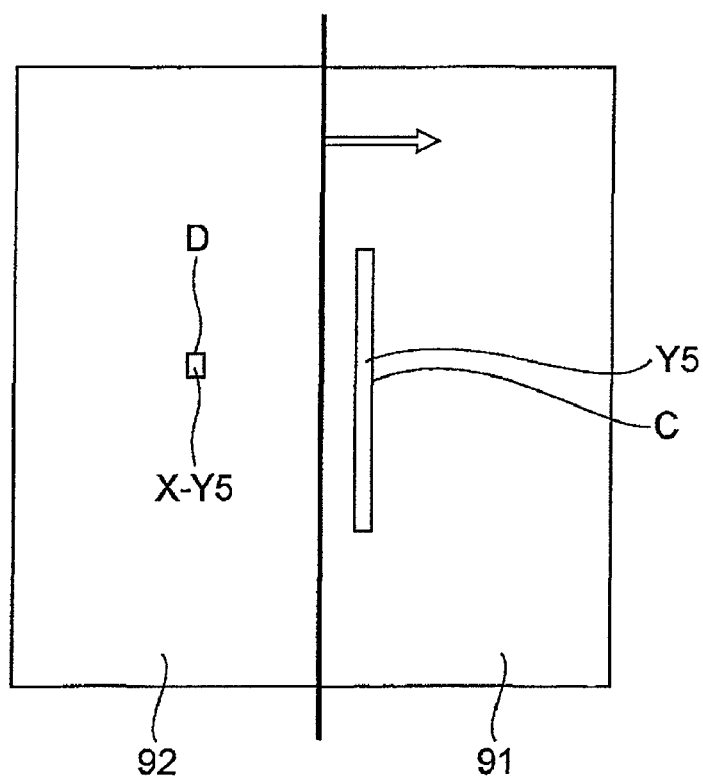

Example 2 is carried out under totally the same condition as Example 1 mentioned above but differs therefrom in that the unit of converging light and machining is a pattern having a fixed area instead of a dot. That is, as illustrated in FIG. 31, Example 2 initially employs a linear pattern A having an area Y4 as a converging region in the machining region 91 and a pattern B having an area (X−Y4) as a converging region in the shielding region 92 (FIG. 31(a)). Subsequently employed are a linear pattern C having an area Y5 as a converging region in the machining region 91 and a pattern D having an area (X−Y5) as a converging region in the shielding region 92 (FIG. 31(b)). Here, Y4 and Y5 are examples of areas (area Y in the claims) of parts selectively placed in the machining region 91 and have the relationship of Y4<Y5 in terms of magnitude. The relationship of Y4 and Y5 can more easily be understood in connection with the above-mentioned Example 1 if the areas Y4 and Y5 are assumed to be areas of 2 and 4 dots, respectively, for example. X is the total area of the laser beam converging region (area of 5 dots in the above-mentioned example) as mentioned above, while the pattern B having an area (X−Y4) and the pattern D having an area (X−Y5) may be in any forms.

FIG. 32 is a chart listing laser beam intensities in respective converging regions in Example 2. The laser beam intensity is found to be substantially constant (within the range of 910 nW to 920 nW) among the converging regions in Example 2, since the total area of converging regions is fixed at X even when the area of the converging region varies in the machining region 91.

Example 3

Irradiating the inside of glass as an object to be machined with a femtosecond laser beam can change its refractive index. Applying this technique can form optical waveguides, three-dimensional optical circuits, and the like within glass. When machined in a multipoint scheme as mentioned above, an optical waveguide or three-dimensional optical circuit can be formed at a high speed within glass. However, the refractive index change in glass varies depending on the intensity of the femtosecond laser beam.

Figure 21:
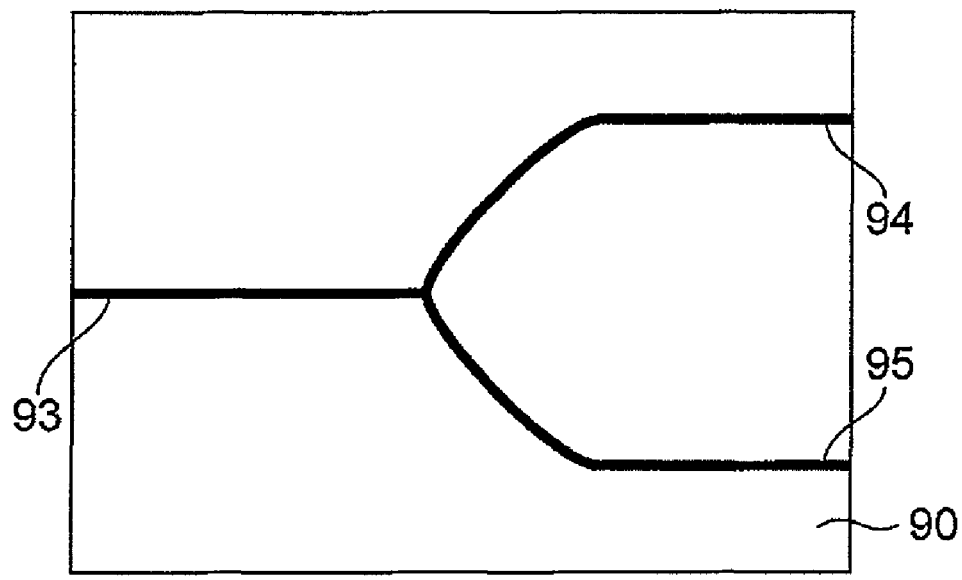
FIG. 21 is a plan view of Y-branched optical waveguides.

For example, assume a case where Y-branched optical waveguides illustrated in FIG. 21 are formed. The object 90 in this case is glass in which optical waveguides 93 to 95 shaped like a Y branch are formed by irradiation with a laser beam.

Figure 22:
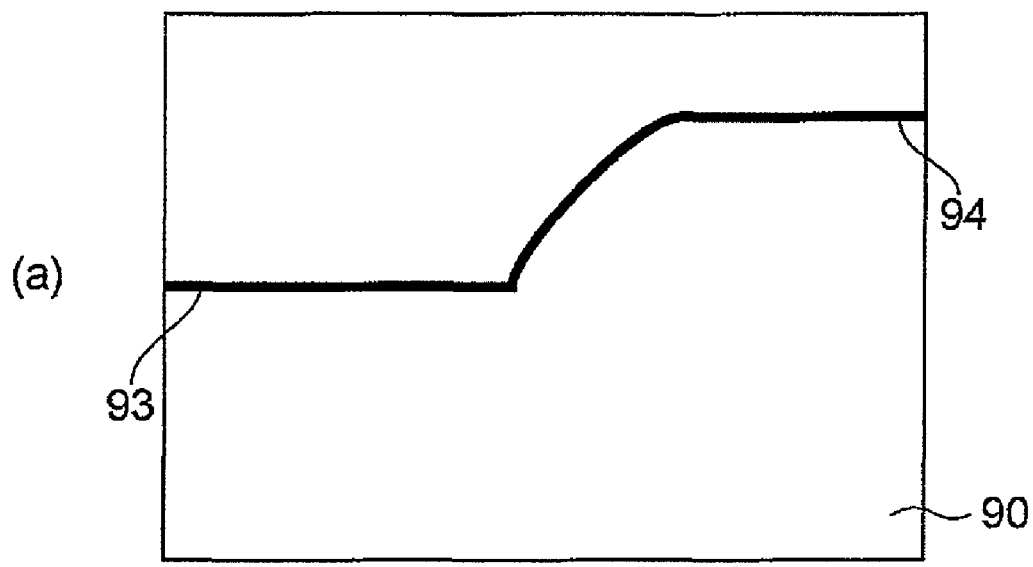
FIG. 22 is a diagram explaining a method of forming Y-branched optical waveguides of a comparative example in the description of Example 3.
Figure 22:
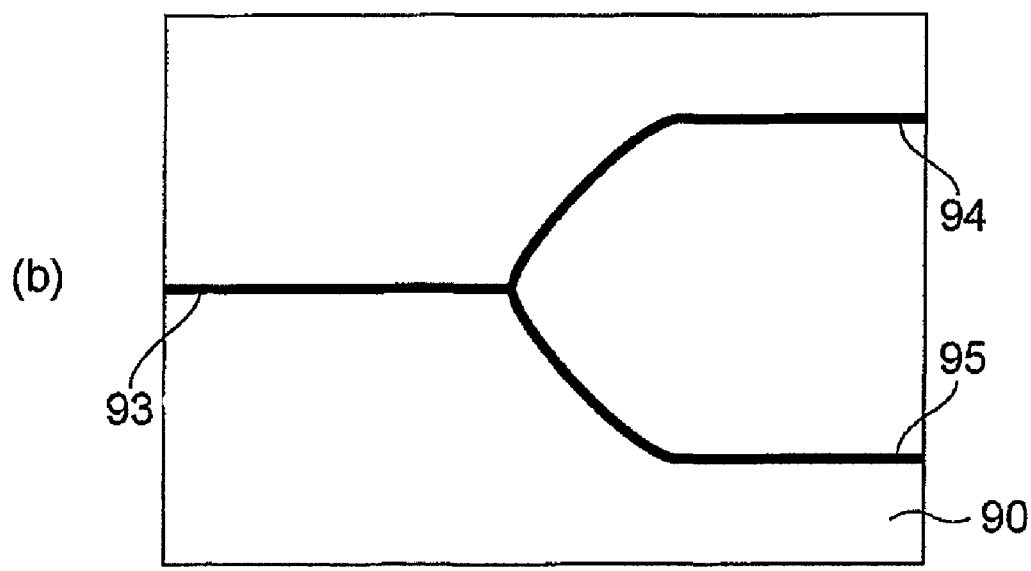

As illustrated in FIG. 22, a comparative example using no spatial light modulator sequentially forms the optical waveguides 93, 94 (FIG. 22(a)), and then the optical waveguide 95 (FIG. 22(b)). This comparative example machines the optical waveguides one by one and thus takes a long machining time.

Moving the object as in the fifth embodiment enables high-speed forming but changes the intensity between before and after branching, whereby the refractive index changes at the branching point. For evading this, the quantity of incident light is required be adjusted between before and after branching.

Figure 23:
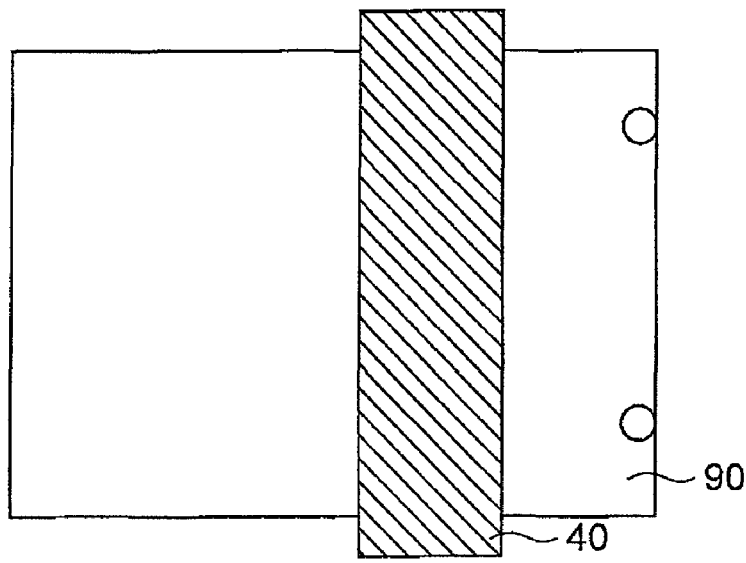
FIG. 23 is a diagram explaining a method of forming Y-branched optical waveguides of Example 3.
Figure 23:
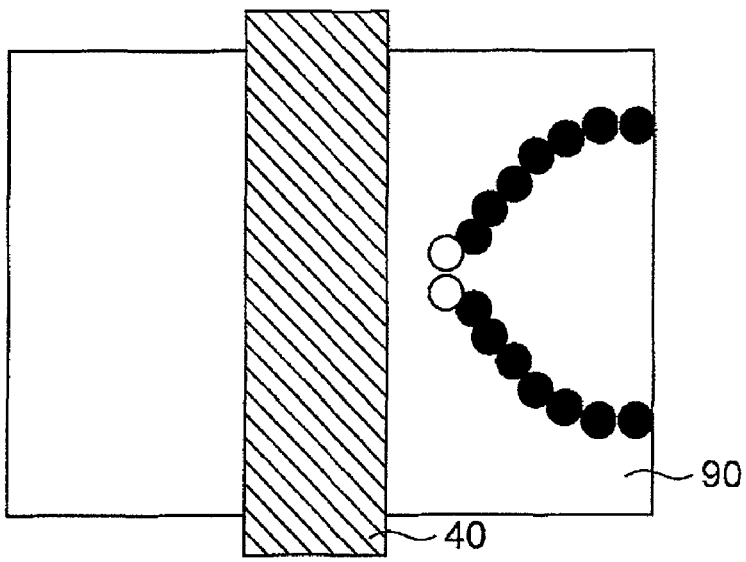
Figure 23:
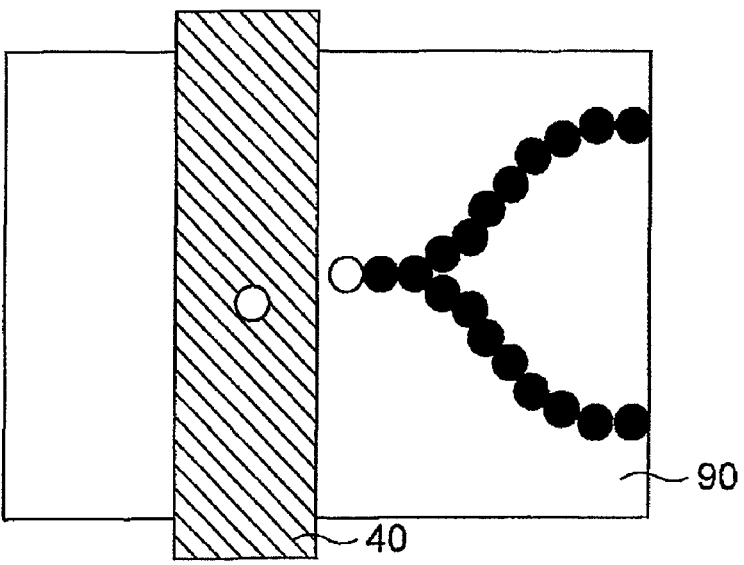

In the example corresponding to the above-mentioned fifth embodiment, 2 points are always reproduced as illustrated in FIG. 23, so that the laser beam intensity is substantially constant at each converging position. Therefore, Y-branched optical waveguides can be produced at a high speed with a high precision. In Example 3 explained in the foregoing, the unit of converging light and machining may be a pattern having a fixed area instead of a dot as a matter of course. In this case, each circle in FIG. 23 refers to a pattern having a predetermined area.

INDUSTRIAL APPLICABILITY

A device and method are provided, which can easily keep the energy of a laser beam irradiating each converging position substantially constant even when the number of laser beam converging positions in a machining region or the area of laser beam converging regions in the machining region varies.

The invention claimed is:

1. A laser machining device for machining an object to be machined by irradiating a machining region in the object with a converged laser beam, the device comprising:
    a laser light source for outputting a laser beam;
    a phase-modulating spatial light modulator for inputting the laser beam outputted from the laser light source, displaying a hologram modulating a phase of the laser beam at each of a plurality of pixels arranged two-dimensionally, and outputting the phase-modulated laser beam;
    a converging optical system disposed downstream of the spatial light modulator; and
    a controller for causing the spatial light modulator to display such a hologram that the laser beam outputted from the spatial light modulator is converged at a plurality of converging positions by the converging optical system;
    wherein the controller causes the spatial light modulator to display a plurality of holograms sequentially and,
    when the laser beam outputted from the spatial light modulator displaying each of the plurality of holograms is fed into the converging optical system, lets the converging optical system converge the laser beam at converging positions having a fixed number of M, selectively places N converging positions out of the M converging positions into the machining region, and machines the object, where M is an integer of 2 or greater, and N is an integer of at least 1 but less than M.

2. A laser machining device according to claim 1, further comprising a shielding member for blocking the laser beam such that the (M−N) converging positions out of the M converging positions formed by the converging optical system excluding the N converging positions are kept from being placed in the machining region.

3. A laser machining device according to claim 1, wherein the number M equals the maximum number L of converging positions for machining a predetermined part of the object, where L is an integer.

4. A laser machining device according to claim 1, wherein the number M is greater than the maximum number L of converging positions for machining a predetermined part of the object; and
    wherein the controller causes the spatial light modulator to display the hologram such that the (M−L) converging positions out of the M converging positions excluding the maximum number L of converging positions are always kept from being placed in the machining region, where L is an integer.

5. A laser machining device according to claim 1, wherein the controller causes the spatial light modulator to display the hologram such that the laser beam converged at the (M−N) or (M−L) converging positions has a variable intensity.

6. A laser machining device according to claim 1, further comprising a 4f optical system, disposed between the spatial light modulator and converging optical system, including first and second lenses and a shielding member disposed between the first and second lenses;
    wherein the shielding member blocks the laser beam such that the (M−N) converging positions out of the M converging positions formed by the converging optical system excluding the N converging positions are kept from being placed in the machining region.

7. A laser machining device according to claim 1, further comprising a 4f optical system, disposed between the spatial light modulator and converging optical system, including first and second lenses and a mirror disposed between the first and second lenses;
    wherein the mirror reflects the laser beam such that the (M−N) converging positions out of the M converging positions formed by the converging optical system excluding the N converging positions are kept from being placed in the machining region.

8. A laser machining device according to claim 1, wherein the controller causes the spatial light modulator to display the hologram such that the (M−N) converging positions out of the M converging positions formed by the converging optical system excluding the N converging positions are placed in a region on the outside of the machining region.

9. A laser machining device according to claim 8, wherein the outside region is a space above the object.

10. A laser machining device according to claim 8, wherein the outside region is a space flanking the object.

11. A laser machining device according to claim 1, wherein the object is provided with an uninfluential region kept from influencing the machining of the object even when irradiated with the converged laser beam; and
    wherein the controller causes the spatial light modulator to display the hologram such that the (M−N) converging positions out of the M converging positions formed by the converging optical system excluding the N converging positions are placed in the uninfluential region.

12. A laser machining device according to claim 1, further comprising a mover for relatively moving the object; and
    wherein the controller causes the spatial light modulator to sequentially display a plurality of holograms and makes the mover relatively move the object.

13. A laser machining method for machining an object to be machined by irradiating a machining region in the object with a converged laser beam, the method using:
    a laser light source for outputting a laser beam;
    a phase-modulating spatial light modulator for inputting the laser beam outputted from the laser light source, displaying a hologram modulating a phase of the laser beam at each of a plurality of pixels arranged two-dimensionally, and outputting the phase-modulated laser beam;
    a converging optical system disposed downstream of the spatial light modulator; and
    a controller for causing the spatial light modulator to display such a hologram that the laser beam outputted from the spatial light modulator is converged at a plurality of converging positions by the converging optical system;

wherein the controller causes the spatial light modulator to display a plurality of holograms sequentially and, when the laser beam outputted from the spatial light modulator displaying each of the plurality of holograms is fed into the converging optical system, lets the converging optical system converge the laser beam at converging positions having a fixed number of M, selectively places N converging positions out of the M converging positions into the machining region, and machines the object, where M is an integer of 2 or greater, and N is an integer of at least 1 but less than M.

14. A laser machining method according to claim 13, further using a shielding member for blocking the laser beam such that the (M−N) converging positions out of the M converging positions formed by the converging optical system excluding the N converging positions are kept from being placed in the machining region.

15. A laser machining method according to claim 13, wherein the number M equals the maximum number L of converging positions for machining a predetermined part of the object.

16. A laser machining method according to claim 13, wherein the number M is greater than the maximum number L of converging positions for machining a predetermined part of the object; and wherein the controller causes the spatial light modulator to display the hologram such that the (M−L) converging positions out of the M converging positions excluding the maximum number L of converging positions are always kept from being placed in the machining region.

17. A laser machining method according to claim 13, wherein the controller causes the spatial light modulator to display the hologram such that the laser beam converged at the (M−N) or (M−L) converging positions has a variable intensity.

18. A laser machining method according to claim 13, further using a 4f optical system, disposed between the spatial light modulator and converging optical system, including first and second lenses and a shielding member disposed between the first and second lenses;

wherein the shielding member blocks the laser beam such that the (M−N) converging positions out of the M converging positions formed by the converging optical system excluding the N converging positions are kept from being placed in the machining region.

19. A laser machining method according to claim 13, further using a 4f optical system, disposed between the spatial light modulator and converging optical system, including first and second lenses and a mirror disposed between the first and second lenses;

wherein the mirror reflects the laser beam such that the (M−N) converging positions out of the M converging positions formed by the converging optical system excluding the N converging positions are kept from being placed in the machining region.

20. A laser machining method according to claim 13, wherein the controller causes the spatial light modulator to display the hologram such that the (M−N) converging positions out of the M converging positions formed by the converging optical system excluding the N converging positions are placed in a region on the outside of the machining region.

21. A laser machining method according to claim 20, wherein the outside region is a space above the object.

22. A laser machining method according to claim 20, wherein the outside region is a space flanking the object.

23. A laser machining method according to claim 13, wherein the object is provided with an uninfluential region kept from influencing the machining of the object even when irradiated with the converged laser beam; and wherein the controller causes the spatial light modulator to display the hologram such that the (M−N) converging positions out of the M converging positions formed by the converging optical system excluding the N converging positions are placed in the uninfluential region.

24. A laser machining method according to claim 13, further using a mover for relatively moving the object; and wherein the controller causes the spatial light modulator to sequentially display a plurality of holograms and makes the mover relatively move the object.

25. A laser machining device for machining an object to be machined by irradiating a machining region in the object with a converged laser beam, the device comprising:

a laser light source for outputting a laser beam;

a phase-modulating spatial light modulator for inputting the laser beam outputted from the laser light source, displaying a hologram modulating a phase of the laser beam at each of a plurality of pixels arranged two-dimensionally, and outputting the phase-modulated laser beam;

a converging optical system disposed downstream of the spatial light modulator; and a controller for causing the spatial light modulator to display such a hologram that the laser beam outputted from the spatial light modulator is converged into a predetermined converging region by the converging optical system;

wherein the controller causes the spatial light modulator to display a plurality of holograms sequentially and, when the laser beam outputted from the spatial light modulator displaying each of the plurality of holograms is fed into the converging optical system, lets the converging optical system converge the laser beam into a converging region having a fixed area X through the converging optical system, selectively places a converging region having an area Y out of the converging region having the area X into the machining region, and machines the object, where X is a positive number, and Y is a positive number not greater than X.

26. A laser machining device according to claim 25, further comprising a shielding member for blocking the laser beam such that the converging region having the area (X−Y) out of the converging region having the area X formed by the converging optical system excluding the converging region having the area Y is kept from being placed in the machining region.

27. A laser machining device according to claim 25, wherein the area X equals the maximum area Z of the converging region for machining a predetermined part of the object, where Z is a positive number.

28. A laser machining device according to claim 25, wherein the area X is greater than the maximum area Z of the converging region for machining a predetermined part of the object; and wherein the controller causes the spatial light modulator to display the hologram such that the converging region having the area (X−Z) out of the converging region having the area X excluding the converging region having the maximum area Z is always kept from being placed in the machining region, where Z is a positive number.

29. A laser machining device according to claim 25, wherein the controller causes the spatial light modulator to display the hologram such that the laser beam converged into the converging region having the area (X-Y) or (X-Z) has a variable intensity.

30. A laser machining device according to claim 25, further comprising a 4f optical system, disposed between the spatial light modulator and converging optical system, including first and second lenses and a shielding member disposed between the first and second lenses;
wherein the shielding member blocks the laser beam such that the converging region having the area (X-Y) out of the converging region having the area X formed by the converging optical system excluding the converging region having the area Y is kept from being placed in the machining region.

31. A laser machining device according to claim 25, further comprising a 4f optical system, disposed between the spatial light modulator and converging optical system, including first and second lenses and a mirror disposed between the first and second lenses;
wherein the mirror reflects the laser beam such that the converging region having the area (X-Y) out of the converging region having the area X formed by the converging optical system excluding the converging region having the area Y is kept from being placed in the machining region.

32. A laser machining device according to claim 25, wherein the controller causes the spatial light modulator to display the hologram such that the converging region having the area (X-Y) out of the converging region having the area X formed by the converging optical system excluding the converging region having the area Y is placed in a region on the outside of the machining region.

33. A laser machining device according to claim 32, wherein the outside region is a space above the object.

34. A laser machining device according to claim 32, wherein the outside region is a space flanking the object.

35. A laser machining device according to claim 25, wherein the object is provided with an uninfluential region kept from influencing the machining of the object even when irradiated with the converged laser beam; and
wherein the controller causes the spatial light modulator to display the hologram such that the converging region having the area (X-Y) out of the converging region having the area X formed by the converging optical system excluding the converging region having the area Y is placed in the uninfluential region.

36. A laser machining device according to claim 25, further comprising a mover for relatively moving the object, while the controller causes the spatial light modulator to sequentially display a plurality of holograms and makes the mover relatively move the object.

37. A laser machining method for machining an object to be machined by irradiating a machining region in the object with a converged laser beam, the method using:
a laser light source for outputting a laser beam;
a phase-modulating spatial light modulator for inputting the laser beam outputted from the laser light source, displaying a hologram modulating a phase of the laser beam at each of a plurality of pixels arranged two-dimensionally, and outputting the phase-modulated laser beam;
a converging optical system disposed downstream of the spatial light modulator; and
a controller for causing the spatial light modulator to display such a hologram that the laser beam outputted from the spatial light modulator is converged into a predetermined converging region by the converging optical system;
wherein the controller causes the spatial light modulator to display a plurality of holograms sequentially and,
when the laser beam outputted from the spatial light modulator displaying each of the plurality of holograms is fed into the converging optical system, lets the converging optical system converge the laser beam into a converging region having a fixed area X, selectively places a converging region having an area Y out of the converging region having the area X into the machining region, and machines the object, where X is a positive number, and Y is a positive number not greater than X.

38. A laser machining method according to claim 37, further using a shielding member for blocking the laser beam such that the converging region having the area (X-Y) out of the converging region having the area X formed by the converging optical system excluding the converging region having the area Y is kept from being placed in the machining region.

39. A laser machining method according to claim 37, wherein the area X equals the maximum area Z of the converging region for machining a predetermined part of the object, where Z is a positive number.

40. A laser machining method according to claim 37, wherein the area X is greater than the maximum area Z of the converging region for machining a predetermined part of the object; and
wherein the controller causes the spatial light modulator to display the hologram such that the converging region having the area (X-Z) out of the converging region having the area X excluding the converging region having the maximum area Z is always kept from being placed in the machining region, where Z is a positive number.

41. A laser machining method according to claim 37, wherein the controller causes the spatial light modulator to display the hologram such that the laser beam converged into the converging region having the area (X-Y) or (X-Z) has a variable intensity.

42. A laser machining method according to claim 37, further using a 4f optical system, disposed between the spatial light modulator and converging optical system, including first and second lenses and a shielding member disposed between the first and second lenses;
wherein the shielding member blocks the laser beam such that the converging region having the area (X-Y) out of the converging region having the area X formed by the converging optical system excluding the converging region having the area Y is kept from being placed in the machining region.

43. A laser machining method according to claim 37, further using a 4f optical system, disposed between the spatial light modulator and converging optical system, including first and second lenses and a mirror disposed between the first and second lenses;
wherein the mirror reflects the laser beam such that the converging region having the area (X-Y) out of the converging region having the area X formed by the converging optical system excluding the converging region having the area Y is kept from being placed in the machining region.

44. A laser machining method according to claim 37, wherein the controller causes the spatial light modulator to display the hologram such that the converging region having the area (X-Y) out of the converging region having the area X formed by the converging optical system excluding the converging region having the area Y is placed in a region on the outside of the machining region.

45. A laser machining method according to claim 44, wherein the outside region is a space above the object.

46. A laser machining method according to claim 44, wherein the outside region is a space flanking the object.

47. A laser machining method according to claim 37, wherein the object is provided with an uninfluential region kept from influencing the machining of the object even when irradiated with the converged laser beam; and wherein the controller causes the spatial light modulator to display the hologram such that the converging region having the area (X–Y) out of the converging region having the area X formed by the converging optical system excluding the converging region having the area Y is placed in the uninfluential region.

48. A laser machining method according to claim 37, further using a mover for relatively moving the object; and wherein the controller causes the spatial light modulator to sequentially display a plurality of holograms and makes the mover relatively move the object.

* * * * *